(12) United States Patent
Osawa

(10) Patent No.: US 8,708,585 B2
(45) Date of Patent: Apr. 29, 2014

(54) IMAGING APPARATUS AND LENS UNIT

(75) Inventor: Toshifumi Osawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 114 days.

(21) Appl. No.: 13/312,807

(22) Filed: Dec. 6, 2011

(65) Prior Publication Data

US 2012/0155853 A1  Jun. 21, 2012

(30) Foreign Application Priority Data

Dec. 15, 2010 (JP) .................. 2010-279881

(51) Int. Cl.
*G02B 17/00* (2006.01)

(52) U.S. Cl.
USPC .......................................... 396/529

(58) Field of Classification Search
USPC .......................................... 396/529
See application file for complete search history.

(56) References Cited

U.S. PATENT DOCUMENTS

| 8,374,499 B2* | 2/2013 | Sakamoto | 396/532 |
| 2011/0080488 A1* | 4/2011 | Okamoto et al. | 348/220.1 |
| 2013/0141609 A1* | 6/2013 | Watazawa | 348/222.1 |

FOREIGN PATENT DOCUMENTS

JP  9-304804 A  11/1997

* cited by examiner

*Primary Examiner* — Clayton E LaBalle
*Assistant Examiner* — Dennis Hancock
(74) *Attorney, Agent, or Firm* — Canon USA, Inc. IP Division

(57) ABSTRACT

An imaging apparatus includes a first terminal and a second terminal and a control unit configured to perform switching between a first communication mode for outputting a clock signal via the first terminal and communicating with a mounted lens unit via the second terminal based on the clock signal and a second communication mode for communicating with the mounted lens unit via the first terminal or the second terminal without using the clock signal. The control unit continuously sets the first communication mode if the second communication mode is not usable for the mounted lens unit. On the other hand, the control unit sets the second communication mode if the second communication mode is available for the mounted lens unit and sets a baud rate to communicate with the lens unit in the second communication mode to be a baud rate value received from the lens unit.

15 Claims, 16 Drawing Sheets imaging apparatus that can communicate with a lens unit to transmit and receive information and a lens unit that can be detachably mounted on the imaging apparatus.

IMAGING APPARATUS AND LENS UNIT

BACKGROUND OF THE INVENTION

1. Field of the Invention

The present invention relates to an imaging apparatus that can communicate with a lens unit to transmit and receive information and a lens unit that can be detachably mounted on the imaging apparatus.

2. Description of the Related Art

A clock synchronous type serial communication method (i.e., a synchronous serial communication method) has been conventionally employed for communications to be performed between a camera and a lens unit in an interchangeable lens system. A conventional technique discussed in Japanese Patent Application Laid-Open No. 9-304804 includes performing synchronous serial communications at a first baud rate so that a camera can communicate with a mounted lens unit even when the lens unit is an old type. If communication contents reveal that a mounted lens unit is a new type, then the method includes starting synchronous serial communications at a second baud rate that is higher than the first baud rate.

Further, the above-described conventional method includes switching a communication terminal circuit from an open drain type to a Complementary Metal Oxide Semiconductor (CMOS) type that is suitable for high-speed communications, in the above-described baud rate switching operation. When the above-described conventional technique is employed for a camera communication system, the camera can operate at a lower speed when it is combined with an old type lens unit and can operate at a higher speed when it is combined with a new type lens unit.

According to the conventional synchronous serial communication method, a lens microcomputer analyzes data received during an interval between a preceding communication and a succeeding communication and sets data to be transmitted to the camera in the next communication based on the received data. To this end, a waiting time (Busy) is provided to enable the lens microcomputer to execute required processing.

During the waiting time (Busy), the lens microcomputer does not accept any communication data transmitted from the camera. In other words, a camera microcomputer is kept in a standby state until the lens microcomputer is released from the "Busy state" even when the clock frequency is raised. Therefore, communication performances of the camera microcomputer cannot be improved sufficiently.

On the other hand, the lens microcomputer frequently receives a communication interrupt from the camera. When an interrupt signal is received from the camera, the lens microcomputer prioritizes communication interrupt processing over other processing to output a "Busy signal" and subsequently cancel the "Busy signal." Therefore, communication performances of the lens microcomputer cannot be improved sufficiently.

SUMMARY OF THE INVENTION

Exemplary embodiments of the present invention are directed to a camera system that can improve operation performances of a camera and an interchangeable lens, even when the interchangeable lens is an old type lens operable according to a conventional communication method only.

According to an aspect of the present invention, an imaging apparatus to which a lens unit can be detachably mounted includes a first terminal and a second terminal usable to communicate with the mounted lens unit, and a control unit configured to perform switching between a first communication mode for outputting a clock signal via the first terminal and communicating with the mounted lens unit via the second terminal based on the clock signal and a second communication mode for communicating with the mounted lens unit via the first terminal or the second terminal without using any clock signal. The control unit is configured to continuously set the first communication mode if it is determined that the second communication mode is not usable for the mounted lens unit and set the second communication mode if it is determined that the second communication mode is available for the mounted lens unit, and is further configured to set a baud rate to communicate with the lens unit in the second communication mode to be equal to a baud rate value received from the lens unit.

According to another aspect of the present invention, a lens unit attachable to and detachable from an imaging apparatus includes a first terminal and a second terminal usable to communicate with the imaging apparatus, and a control unit configured to perform switching between a first communication mode for receiving a clock signal via the first terminal and communicating with the imaging apparatus via the second terminal based on the clock signal and a second communication mode for communicating with the imaging apparatus via the first terminal or the second terminal without using any clock signal. The control unit is configured to determine a baud rate to be used in the second communication mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
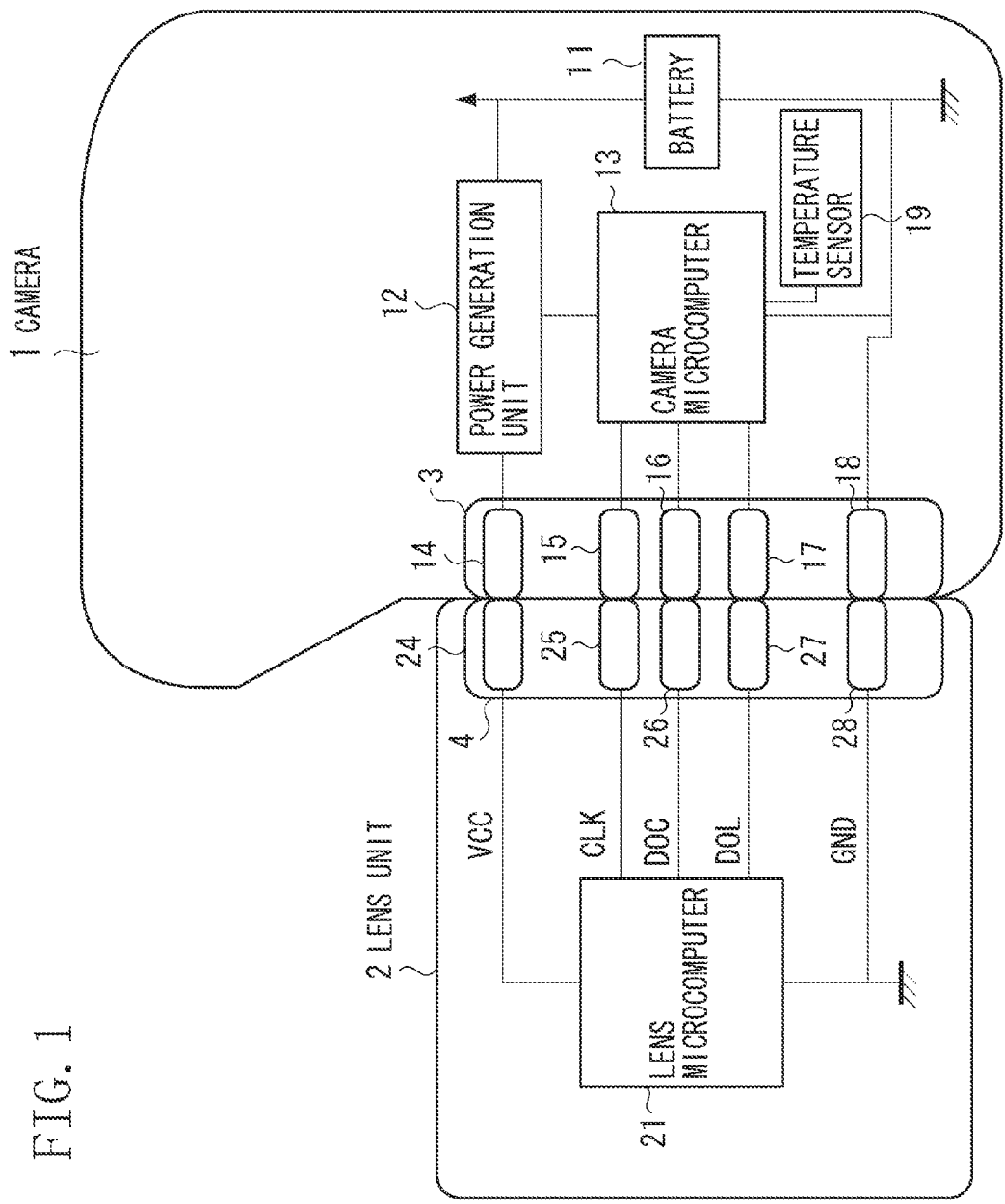
FIG. 1 illustrates a circuit configuration of a camera system including a camera and an interchangeable lens according to an exemplary embodiment of the present invention.

A first exemplary embodiment of the present invention is described below. FIG. 1 illustrates a circuit configuration including a camera 1 and an interchangeable lens unit 2 according to an exemplary embodiment of the present invention. In FIG. 1, the interchangeable lens unit 2 is detachably mounted on the camera 1 that serves as an imaging apparatus. The camera 1 has a mounting portion 3 serving as a connection portion. The lens unit 2 has a lens mount portion 4 serving as an accessory connection portion. The camera 1 includes a battery 11, a power generation unit 12, and a camera microcomputer 13 provided in the body thereof.

The battery 11 can generate a predetermined voltage, which can be supplied to the power generation unit 12. The power generation unit 12 can generate and supply an optimum power voltage to enable each electric circuit, such as the camera microcomputer 13, to operate stably. The camera microcomputer 13 can perform various controls to be realized by the camera 1 and further perform various communications with the interchangeable lens 2.

In general, the camera 1 includes a light metering sensor that can be used for an exposure control, a range finding sensor that can be used for an auto focus control, an image sensor that can be used for capturing a digital image, a driving circuit for the image sensor, an analog-digital (A/D) conversion circuit, and an image processing circuit. The above-described circuit components are fundamental components, although not described in detail in the present exemplary embodiment.

The camera 1 includes a plurality of contact terminals, i.e., a camera power source terminal 14, a camera CLK terminal 15, a camera DOC terminal 16, a camera DOL terminal 17, and a camera GND terminal 18, which are provided on the mounting portion 3. The camera 1 can transmit and receive electric signals to and from the lens unit 2 via the terminals 14 to 18. The camera power source terminal 14 is a terminal via which the camera 1 can supply lens power generated by the power generation unit 12 to the lens unit 2.

The camera CLK terminal 15 is a terminal via which the camera 1 can transmit a synchronous clock signal to communicate with the lens unit 2. The camera DOC terminal 16 is a terminal via which the camera 1 can transmit communication data to the lens unit 2. The camera DOL terminal 17 is a terminal via which the camera 1 can receive communication data from the lens unit 2.

The camera CLK terminal 15 corresponds to a first terminal. The camera DOC terminal 16 and the camera DOL terminal 17 correspond to a second terminal. These terminals 15 to 17 are electrically connected to the camera microcomputer 13. The camera GND terminal 18 is grounded. Further, the camera 1 includes a temperature sensor 19 that can output information relating to camera's internal temperature to the camera microcomputer 13.

The interchangeable lens 2 includes a lens microcomputer 21 provided in the body thereof. The microcomputer 21 can perform various controls to be realized by the lens unit 2 and further perform various communications with the camera 1. The lens unit 2 includes a plurality of contact terminals, i.e., a lens power source terminal 24, a lens CLK terminal 25, a lens DOC terminal 26, a lens DOL terminal 27, and a lens GND terminal 28, which are provided on the lens mount portion 4. The lens unit 2 can transmit and receive signals to and from the camera 1 via the terminals 24 to 28.

The lens power source terminal 24 is a terminal via which the lens unit 2 can receive electric power from the camera 1. The lens CLK terminal 25 is a terminal via which the lens unit 2 can transmit a synchronous clock signal to communicate with the camera 1. The lens DOC terminal 26 is a terminal via which the lens unit 2 can receive communication data from the camera 1.

The lens DOL terminal 27 is a terminal via which the lens unit 2 can transmit communication data to the camera 1. The lens CLK terminal 25 corresponds to a first lens terminal. The lens DOC terminal 26 and the lens DOL terminal 27 correspond to a second lens terminal. The lens GND terminal 28 is grounded.

When the lens unit 2 is normally mounted on the camera 1, the camera terminals 14 to 18 and the lens terminals 24 to 28 are connected in a one-to-one relationship as illustrated in FIG. 1. Although not illustrated in the drawing, the present invention can also be applied to a camera and a lens unit that perform wireless communications.

Figure 2:
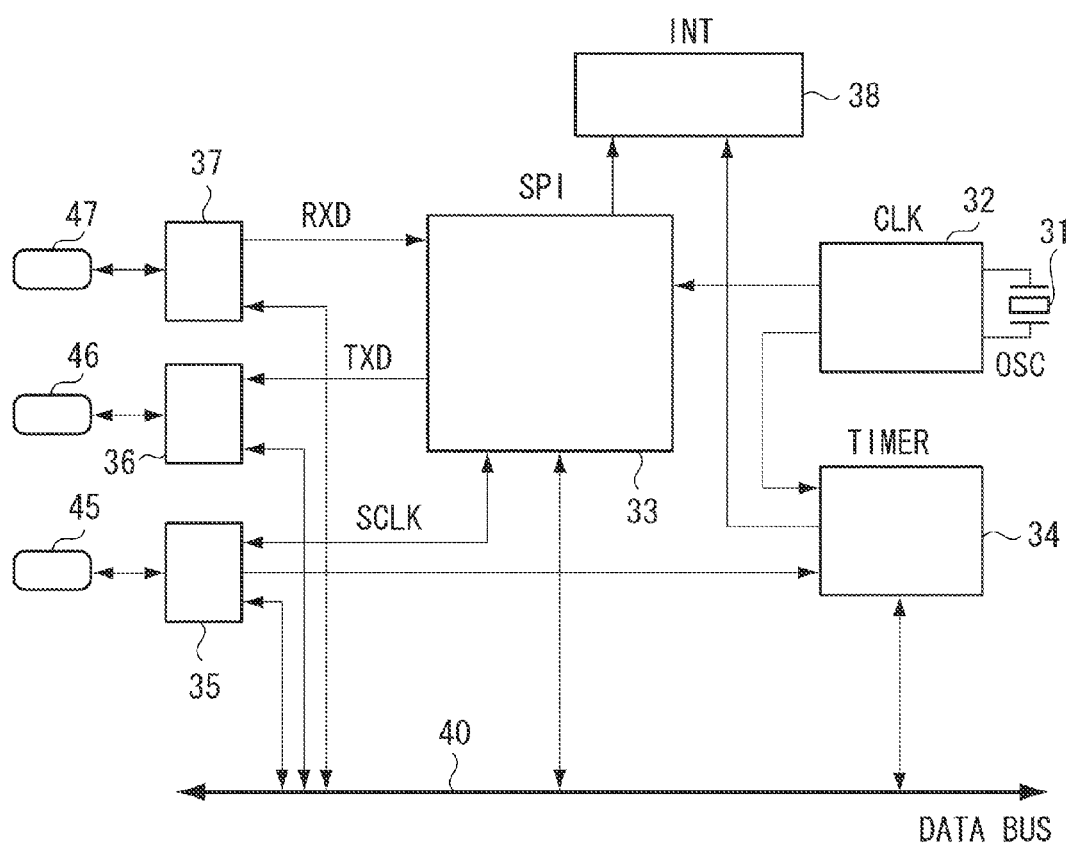
FIG. 2 is a circuit block diagram of a microcomputer according to an exemplary embodiment of the present invention.

FIG. 2 illustrates an example circuit configuration relating to a serial communication control, which is included in the camera microcomputer 13 or the lens microcomputer 21. Although the camera microcomputer 13 and the lens microcomputer 21 are mutually different, the configuration relating to the serial communication control can be similarly provided for the camera microcomputer 13 and the lens microcomputer 21.

An oscillator 31 is, for example, a quartz oscillator or a ceramic oscillator. The oscillator 31 is not limited to a built-in component of the microcomputer and can be an external component. A clock generation circuit 32 includes a source oscillation circuit that is connected to the oscillator 31 and can generate a source oscillation clock, a multiplying circuit that can convert the source oscillation clock into a higher frequency clock, and a clock generation circuit that can generate a clock of an appropriate frequency by frequency demultiplying and synthesizing the high-frequency clock converted by the multiplying circuit.

A communication control circuit 33 can perform various communication controls. When the communication control circuit 33 uses a terminal connected as an input/output (IO) port, the communication control circuit 33 can set an output level and can determine an input level. An example operation that can be performed by the communication control circuit 33 is described below in detail with reference to FIG. 3.

A counter/timer circuit 34 can count the number of pulses when a signal is input and can measure a time width of the input signal. The clock signal generated by the clock generation circuit 32 can be supplied to the communication control circuit 33 and the counter/timer circuit 34. A plurality of I/O control circuits 35 to 37 are connected to input/output terminal 45 to 47, respectively, to switch input/output signals with respect to direction of input/output data, type of input/output signal, and configuration of input/output circuit.

The switching with respect to data input/output direction is a switching between terminal to be used to input data and terminal to be used to output data. The switching with respect to input/output signal type is a switching between input/output signal of ordinary parallel IO signal to be connected to the terminal and input/output signal for the communication control circuit 33 to be connected to the terminal.

The switching with respect to input/output circuit configuration is a switching between output according to the open drain method and output according to the CMOS method, as discussed in Japanese Patent Application Laid-Open No. 9-304804, and a switching between usage and non-usage of pull-up resistor.

The I/O control circuit 35 can perform input/output switching for the input/output terminal 45. The I/O control circuit 35 can receive a synchronous clock signal SCLK from the communication control circuit 33 and can supply the SCLK signal to the counter/timer circuit 34.

The I/O control circuit 36 can perform input/output switching for the input/output terminal 46. The I/O control circuit 36 can receive a serial communication data output signal TXD from the communication control circuit 33. The I/O control circuit 37 can perform input/output switching for the input/output terminal 47. The I/O control circuit 37 can transmit a serial communication data input signal RXD to the communication control circuit 33.

An interrupt control circuit 38 can receive an interrupt generation signal from each of the communication control circuit 33 and the counter/timer circuit 34. The communication control circuit 33, the counter/timer circuit 34, and the I/O control circuits 35 to 37 are connected to the data bus 40 to transmit and receive data required to perform operations. Although not illustrated in the drawings, the microcomputer includes fundamental circuit components, such as an Arithmetic and Logic Unit (ALU), a program counter, a read only memory (ROM), a random access memory (RAM), and an analog-digital (AD) converter.

When the circuit configuration illustrated in FIG. 2 is applied to the camera microcomputer 13, the input/output terminal 45 is connected to the camera CLK terminal 15 illustrated in FIG. 1. The input/output terminal 46 is connected to the camera DOC terminal 16 illustrated in FIG. 1. The input/output terminal 47 is connected to the camera DOL terminal 17 illustrated in FIG. 1.

When the circuit configuration illustrated in FIG. 2 is applied to the lens microcomputer 21, the input/output terminal 45 is connected to the lens CLK terminal 25 illustrated in FIG. 1. The input/output terminal 46 is connected to the lens DOL terminal 27 illustrated in FIG. 1. The input/output terminal 47 is connected to the lens DOC terminal 26 illustrated in FIG. 1. In the present exemplary embodiment, a DOC signal is used for data to be transmitted from the camera 1 to the lens unit 2 and a DOL signal is used for data to be transmitted from the lens unit 2 to the camera 1.

Figure 3:
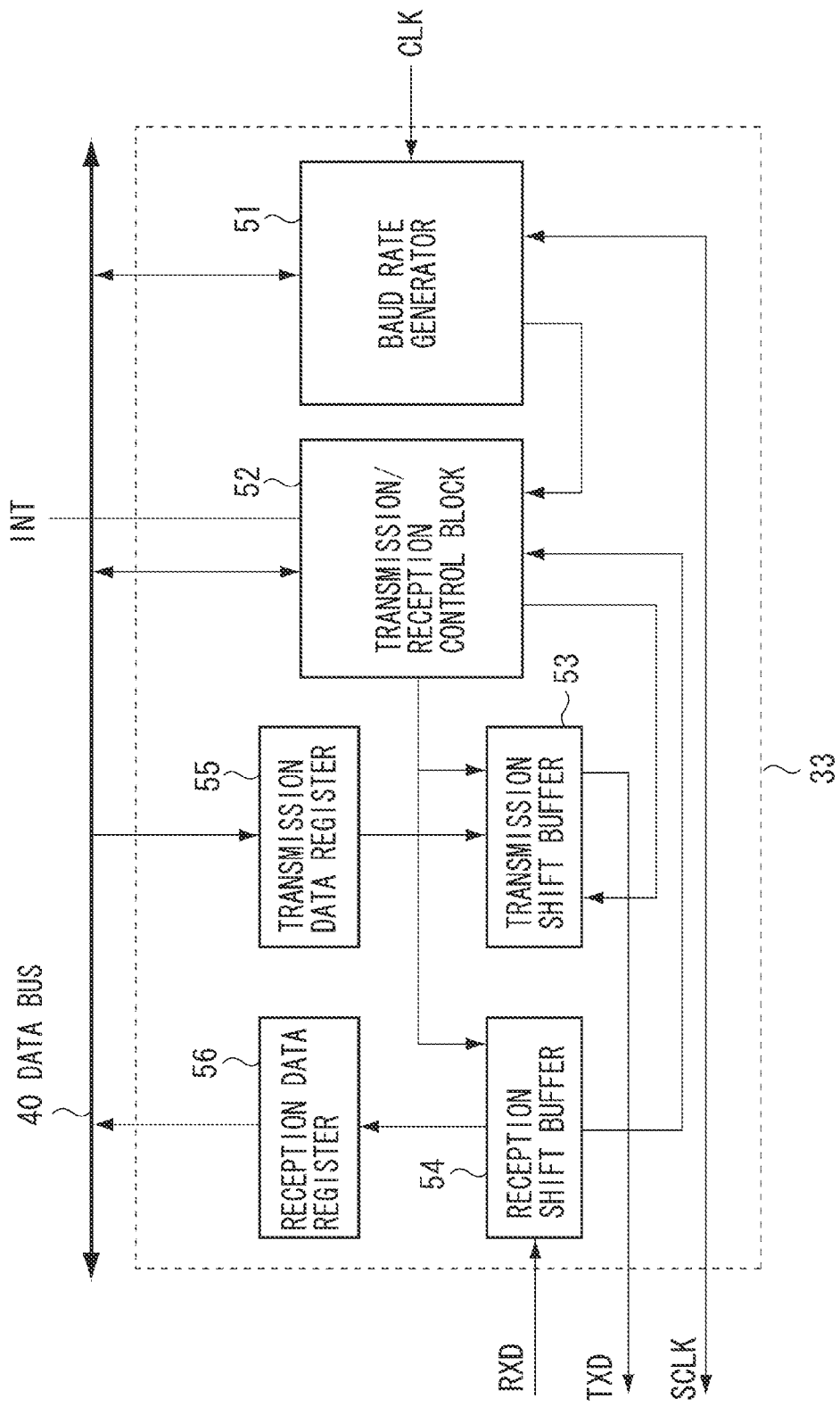
FIG. 3 is a block diagram illustrating a communication control circuit according to an exemplary embodiment of the present invention.

FIG. 3 illustrates a detailed configuration of the communication control circuit 33 illustrated in FIG. 2. A baud rate generator 51 can receive a clock signal having an appropriate frequency from the clock generation circuit 32. The baud rate generator 51 can generate a clock signal required to perform a communication control according to communication setting data received via the data bus 40.

The communication setting data includes various setting data, for example, including switching between master and slave in communications, switching between synchronous communications and asynchronous communications, synchronous clock frequency setting in synchronous communications, and asynchronous sampling clock frequency setting in asynchronous communications.

If the communication setting data includes settings relating to synchronous communications and communication master, the baud rate generator 51 generates a synchronous clock signal SCLK that reflects a synchronous clock frequency setting value in synchronous communications.

If the communication setting data includes settings relating to synchronous communications and communication slave, the synchronous clock signal SCLK is supplied to the baud rate generator 51. The synchronous clock signal SCLK is also supplied to a transmission/reception control block 52.

If the communication setting data includes settings relating to asynchronous communications, a sampling clock that reflects the asynchronous sampling clock frequency setting in asynchronous communications is supplied to the transmission/reception control block 52.

The transmission/reception control block 52 can supply a shift clock to each of a transmission shift buffer 53 and a reception shift buffer 54 based on various communication setting data received via the data bus 40. Further, the transmission/reception control block 52 can input/output a transmission/reception trigger signal to perform timing control for serial communication. Further, the transmission/reception control block 52 can generate an interrupt signal at transmission/reception completion timing of the serial communication.

The transmission shift buffer 53 can receive parallel input data to be transmitted in serial communications and generate a serial output as a signal TXD. The shift clock for the serial output can be supplied from the transmission/reception control block 52. When the system performs asynchronous communications, the transmission trigger signal is supplied from the transmission/reception control block 52.

The reception shift buffer 54 can receive serial input data (i.e., the signal RXD) to be received in serial communications and can generate parallel output signals. The shift clock for the serial input can be supplied from the transmission/reception control block 52. When the system performs asynchronous communications, the reception trigger signal is output to the transmission/reception control block 52.

A transmission data register 55 can receive data to be transmitted via the data bus 40 and can set the received data in the transmission shift buffer 53. A reception data register 56 can receive data from the reception shift buffer 54 and can output the reception data via the data bus 40.

The camera microcomputer 13 can perform synchronous communications with the lens microcomputer 21 in a first communication mode according to communication protocols illustrated in FIG. 11, as described in detail below with reference to a control flow illustrated in FIG. 12.

Figure 11:
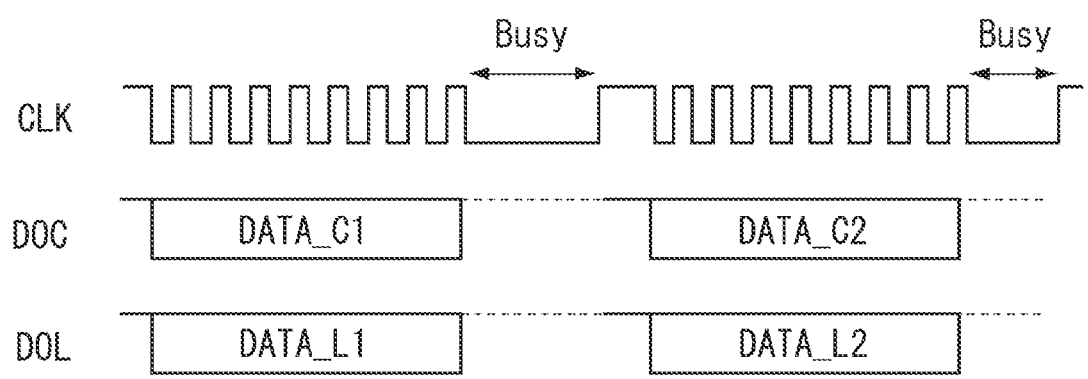
FIG. 11 is a timing chart illustrating communication signals of the camera and the interchangeable lens according to a synchronous communications method.
Figure 12:
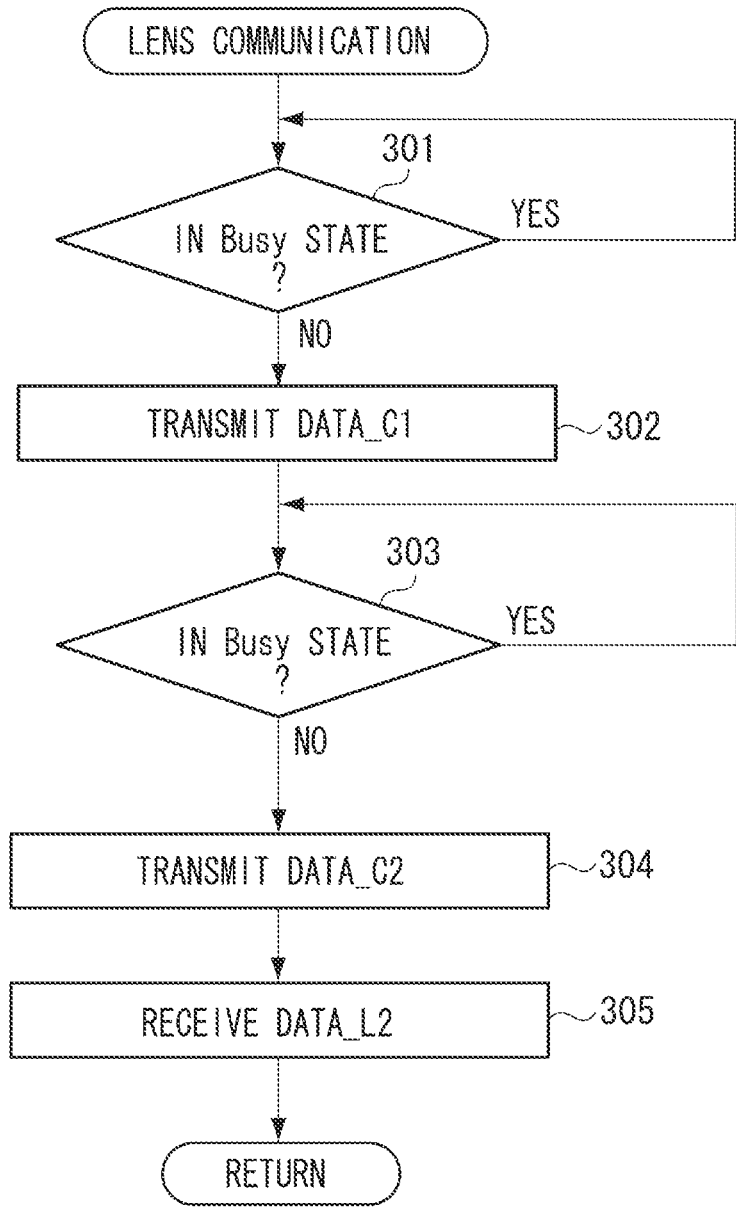
FIG. 12 is a flowchart illustrating an example operation that can be performed by the camera microcomputer according to the synchronous communications method.

In step 301, the camera microcomputer 13 checks the input level of a synchronous clock signal CLK outputting terminal and determines whether the lens unit 2 is in the "Busy state" (see FIG. 11). In the present exemplary embodiment, if the lens microcomputer 21 holds the above-described terminal low in signal level, the camera microcomputer 13 determines that the lens unit 2 is in the "Busy state." The camera microcomputer 13 cannot communicate with the lens microcomputer 21 in the "Busy state."

If the input level of the terminal that generates the signal CLK is held at H level and it is determined that the lens unit 2 is not in the "Busy state" (NO in step 301), the processing proceeds to step 302.

In step 302, the camera microcomputer 13 sets data DATA_C1 (i.e., data to be initially transmitted to the lens microcomputer 21) in the transmission data register 55. The camera microcomputer 13 performs serial communications for a unit transmission data. In general, the data DATA_C1 transmitted to the lens microcomputer 21 is a command to be transmitted to the lens unit 2.

Data DATA_L2 to be transmitted in serial communications for the next unit transmission data is a response data returned from the lens unit 2 in response to the data DATA_C1. Data DATA_L1 to be transmitted from the lens unit 2 to the camera 1 at the same timing as the above-described data DATA_C1 is "don't care data." Therefore, the camera microcomputer 13 does not perform any processing specially.

In step 303, the camera microcomputer 13 checks the input level of the synchronous clock signal CLK outputting terminal and determines whether the lens microcomputer 21 is in the "Busy state." The lens microcomputer 21 analyzes the content of the received data DATA_C1 and sets the "Busy state" by holding the CLK output terminal low in signal level until the lens microcomputer 21 starts corresponding processing. The camera microcomputer 13 waits until the lens microcomputer 21 completes the above-described processing and is brought into the "non-Busy state." Subsequently, the processing proceeds to step 304.

In step 304, the camera microcomputer 13 sets data DATA_C2 (i.e., data to be transmitted to the lens microcomputer 21) in the transmission data register 55 and performs serial communications for a unit transmission data. If it is determined that the data DATA_C1 transmitted in step 302 is a command that requests the lens unit 2 to transmit lens inherent information to the camera 1, the content of the data DATA_C2 becomes "don't care data" and the data DATA_L2 returned from the lens unit 2 has significant meaning.

In step 305, the camera microcomputer 13 stores the data DATA_L2 received from the lens microcomputer 21 in the reception data register 56.

Figure 13:
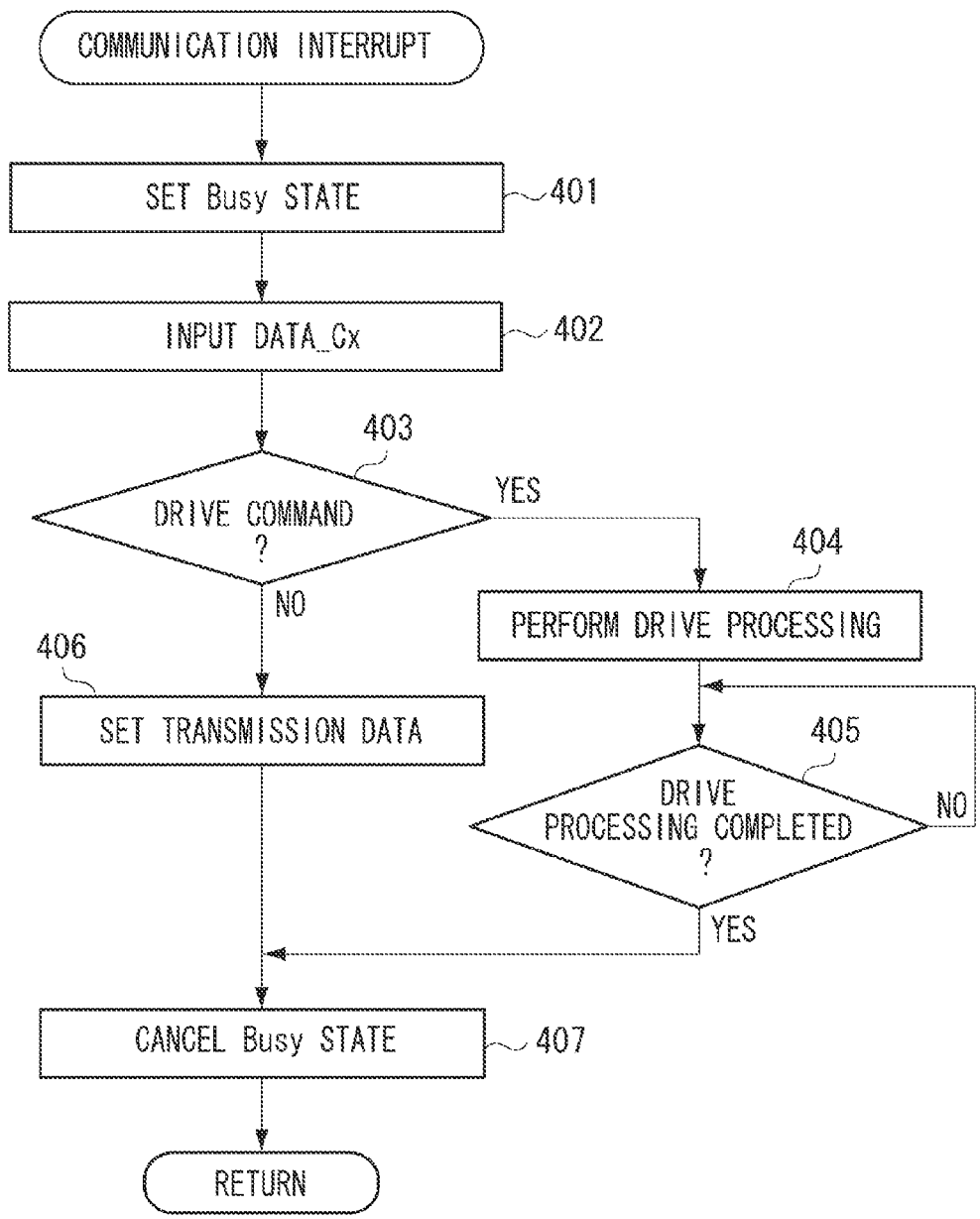
FIG. 13 is a flowchart illustrating an example operation that can be performed by the lens microcomputer according to the synchronous communications method.

The lens microcomputer 21 can communicate with the camera microcomputer 13 according to the communication protocols illustrated in FIG. 11, as described in detail below with reference to a control flow illustrated in FIG. 13. The lens microcomputer 21 serves as a slave in this communication.

The lens microcomputer 21 has a communication interrupt function for generating an interrupt signal if the count number of rise edges of the synchronous clock signal CLK reaches a predetermined number. Thus, the lens microcomputer 21 can detect a reception of a unit transmission data from the camera microcomputer 13 through serial communications based on the above-described communication interrupt function.

In step 401, the lens microcomputer 21 holds a synchronous clock signal CLK receiving terminal low in signal level so that the camera microcomputer 13 can determine that the lens unit 2 is in the "Busy state."

In step 402, the lens microcomputer 21 acquires the reception data DATA_C1 (i.e., the data transmitted from the camera 1) from the reception data register 56 and analyzes the content of the reception data DATA_C1. The reception data transmitted from the camera 1 is nothing more than DATA_C1 initially. However, in the flowchart the reception data transmitted from the camera 1 is represented by a generalized expression DATA_Cx because the data DATA_C2 may be transmitted subsequently.

In step 403, the lens microcomputer 21 determines whether the data DATA_C1 received from the camera 1 is a drive command for an actuator of the lens unit 2. If it is determined that the data DATA_C1 is the drive command (YES in step 403), the processing proceeds to step 404. In step 404, the lens microcomputer 21 performs drive processing for the actuator of the lens unit 2 according to the content of the data DATA_C1 received from the camera 1.

In step 405, the lens microcomputer 21 determines whether the drive processing for the actuator of the lens unit 2 is completed and the next communication from the camera 1 is acceptable. If it is determined that the next communication from the camera 1 is acceptable (YES in step 405), the processing proceeds to step 407.

If it is determined that the data DATA_C1 received from the camera 1 is a lens inherent data transmission request (NO in step 403), the processing proceeds to step 406. In step 406, the lens microcomputer 21 sets required lens inherent data according to the data DATA_C1 received from the camera 1 in the transmission data register 55.

In step 407, the lens microcomputer 21 turns the synchronous clock signal CLK receiving terminal into H level so that the camera 1 can determine that the lens unit 2 is not in the "Busy state."

Figure 4:
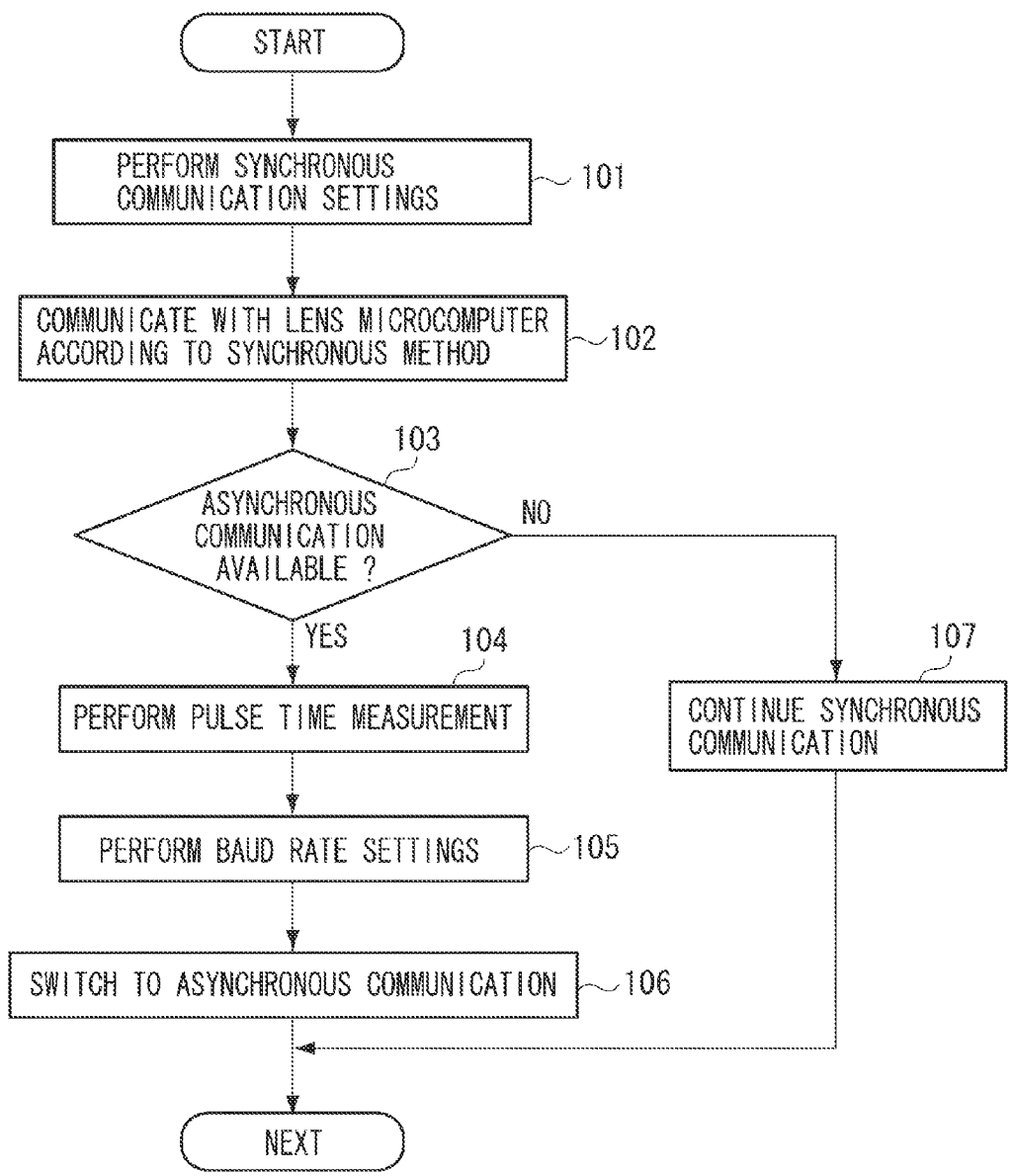
FIG. 4 is a flowchart illustrating an example operation that can be performed by the camera system including the camera and the interchangeable lens according to an exemplary embodiment of the present invention.

FIG. 4 is a flowchart illustrating a communication related setting operation that can be performed by a camera system that includes a camera and a lens unit according to the present invention. The processing illustrated in FIG. 4 is limited to an overall operation to be performed by the camera system. Example operations to be performed by the camera microcomputer and the lens microcomputer are described in detail below with reference to other flowcharts.

If a power switch (not illustrated) is turned on to activate the camera and the lens unit, then in step 101 of the flowchart illustrated in FIG. 4, the camera system starts its operation.

In step 101, the camera microcomputer 13 performs settings for the communication control circuit 33 and the I/O control circuits 35 to 37, as initial settings required to communicate with the lens unit 2, in such a way as to perform synchronous communications available for both old type lenses and new type lenses.

When the camera microcomputer 13 performs communication processing according to the above-described settings, the camera microcomputer 13 serves as a communication master and outputs a communication synchronous clock SCLK signal via the input/output terminal 45. Further, the camera microcomputer 13 outputs a transmission data TXD signal to be transmitted from the camera 1 to the lens unit 2 via the input/output terminal 46. A reception data RXD signal transmitted from the lens unit 2 to the camera 1 is input to the camera microcomputer 13 via the input/output terminal 47.

Even when the lens unit 2 is a new type lens unit that can realize asynchronous communications, the lens unit 2 performs synchronous communication slave settings for the communication control circuit 33 and the I/O control circuits 35 to 37 as initial settings. When the lens microcomputer 21 performs communication processing according to the above-described settings, the lens microcomputer 21 can receive the communication synchronous clock SCLK signal via the input/output terminal 45. In addition, the lens microcomputer 21 can output a transmission data TXD signal to be transmitted from the lens unit 2 to the camera 1 via the input/output terminal 46. A reception data RXD signal transmitted from the camera 1 to the lens unit 2 can be input via the input/output terminal 47.

In step 102, the camera microcomputer 13 and the lens microcomputer 21 perform communications according to a synchronous method. FIG. 11 is a timing chart illustrating example synchronous communications. In the communications illustrated in FIG. 11, the camera microcomputer 13 transmits the data DATA_C1 (i.e., lens information transmission command) to the lens unit 2 to acquire the type and name information of the lens unit 2 or determine whether the lens unit 2 is a new type capable of realizing asynchronous communications.

When the lens microcomputer 21 receives the lens information transmission command from the camera microcomputer 13, the lens microcomputer 21 transmits the data DATA_L2 including corresponding lens information to the camera microcomputer 13.

In step 103, the camera microcomputer 13 analyzes the received lens information DATA_L2 and determines whether the presently mounted lens unit 2 can perform asynchronous communications. If the camera microcomputer 13 determines that the presently mounted lens unit can perform asynchronous communications (YES in step 103), the processing proceeds to step 104.

If the camera microcomputer 13 determines that the presently mounted lens unit cannot perform asynchronous communications (NO in step 103), the processing proceeds to step 107. In step 107, the camera microcomputer 13 and the lens unit 2 continuously perform synchronous communications.

In step 104, the camera microcomputer 13 communicates with the lens microcomputer 21 again according to the synchronous method and transmits a pulse output and time measurement related command for a baud rate adjustment required to perform asynchronous communications. If the lens microcomputer 21 receives the above-described command, the lens microcomputer 21 performs a pulse output and time measurement related operation for the baud rate adjustment required in asynchronous communications.

Figure 9:
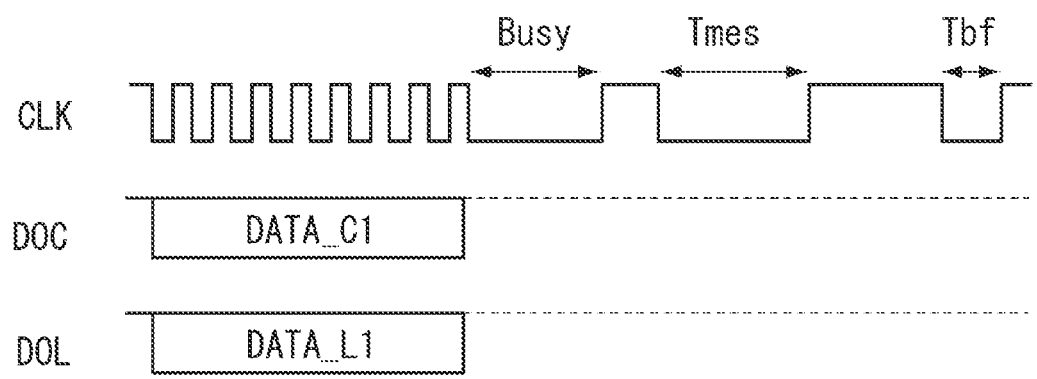
FIG. 9 is a timing chart illustrating communication signals of the camera and the interchangeable lens according to the first exemplary embodiment of the present invention.

FIG. 9 is a timing chart illustrating an output of baud rate adjustment pulses. The camera microcomputer 13 transmits transmission data DATA_C1 including a baud rate adjustment pulses output measurement request command to the lens microcomputer 21, as illustrated in FIG. 9. The lens microcomputer 21 temporarily holds the normal "Busy output" (i.e., CLK signal) low in output level while the lens microcomputer 21 analyzes the command included in the received data. Subsequently, if the lens microcomputer 21 accomplishes the data command analysis, the lens microcomputer 21 turns the CLK signal into H level to cancel the "Busy state" and notifies the camera microcomputer 13 of the cancellation of the "Busy state."

If the level of the CLK signal is H level and the lens microcomputer 21 is not in the "Busy state", the camera microcomputer 13 holds the CLK signal low in output level to generate a baud rate adjustment pulse Tmes. The camera microcomputer 13 outputs the baud rate adjustment pulse Tmes during a period of time that corresponds to a predetermined number of clock counts of the operation clock generated by an oscillation circuit 32 of the camera microcomputer 13.

For example, if the baud rate adjustment pulse Tmes is output by an amount of 65,536 clocks when the operation clock generated by the oscillation circuit 32 of the camera microcomputer 13 is 10 MHz, the baud rate adjustment pulse Tmes is output during a time period of 6.5536 msec. If the operation clock generated by the oscillation circuit 32 of the camera microcomputer 13 becomes 10.1 MHz due to an error in a circuit element, the time width of the baud rate adjustment pulse Tmes becomes 6.4887 msec. In other words, the time width of the baud rate adjustment pulse Tmes reflects the accuracy in the oscillatory frequency of the oscillation circuit of the camera microcomputer 13.

The lens microcomputer 21 causes the counter/timer circuit 34 to start measuring a time duration in response to a fall edge of the signal of the input/output terminal 45 and stop the measurement in response to a rise edge of the signal of the same terminal. Thus, the lens microcomputer 21 measures the time width of the baud rate adjustment pulse Tmes. If the lens microcomputer 21 causes the counter/timer circuit 34 to perform time measurement using 16 MHz clock, the time width of 6.5536 msec. is equivalent to 104,857 counts and the time width of 6.4887 msec. is equivalent to 103,819 counts.

Further, if the lens microcomputer 21 causes the counter/timer circuit 34 to perform time measurement using 16.16 MHz clock, the time width of 6.5536 msec. is equivalent to 105,906 counts and the time width of 6.4887 msec. is equivalent to 10,4857 counts. Accordingly, with reference to a result of the time measurement of the baud rate adjustment pulse Tmes, the lens microcomputer 21 can acquire a relative deviation in the oscillatory frequency accuracy of the camera microcomputer 13 that corresponds to the oscillatory frequency accuracy of the lens microcomputer 21.

In step 105, the lens microcomputer 21 calculates a relative deviation in the oscillatory frequency accuracy of the lens microcomputer 21 based on the count value of the baud rate adjustment pulse Tmes obtained in the step 104 and adjusts the baud rate for asynchronous communications.

As an example, it is now presumed that the predetermined baud rate for asynchronous communications is 19,200 bps. If the oscillation circuit of the lens microcomputer 21 is operating at the oscillatory frequency of 16 MHz without causing any deviation, the lens microcomputer 21 can perform data transmission/reception through asynchronous communications at the baud rate of 19,200 bps.

However, if the oscillation circuit of the lens microcomputer 21 is operating at the oscillatory frequency of 16.16 MHz due to an error in a circuit element, the lens microcomputer 21 performs data transmission/reception through asynchronous communications at the baud rate of 19,392 bps that reflect the deviation in the oscillatory frequency, instead of 19,200 bps (i.e., setting value).

The synchronous clock is not used in asynchronous communications. Therefore, the data transmission/reception may not be performed accurately due to a data sampling error unless the difference in baud rate between the camera microcomputer 13 and the lens microcomputer 21 is in a predetermined range.

Therefore, the lens microcomputer 21 performs optimum baud rate settings conformable to a relative deviation in oscillatory frequency accuracy of the camera microcomputer 13. If the lens microcomputer 21 completes the optimum baud rate settings, the lens microcomputer 21 holds the input/output terminal 45 low in signal level during a predetermined time and notifies the camera microcomputer 13 of the completion of the baud rate settings (see Tbf in the timing chart illustrated in FIG. 9).

In step 106, if the camera microcomputer 13 detects that the lens microcomputer 21 has output the Tbf pulse with reference to the level of the input/output terminal 45, the camera microcomputer 13 changes the method for communicating with the lens unit 2. More specifically, the camera microcomputer 13 performs settings for the communication control circuit 33 and the I/O control circuits 35 to 37 in such a way as to perform asynchronous communications, as a second communication mode, with the lens microcomputer 21.

After completing the output of the Tbf pulse, the lens microcomputer 21 changes the method for communicating with the camera 1. More specifically, the lens microcomputer 21 performs settings for the communication control circuit 33 and the I/O control circuits 35 to 37 in such a way as to perform asynchronous communications with the camera microcomputer 13. When the above-described processing in step 106 is completed, the camera 1 and the lens unit 2 start communicating with each other according to an asynchronous method.

Figure 10:
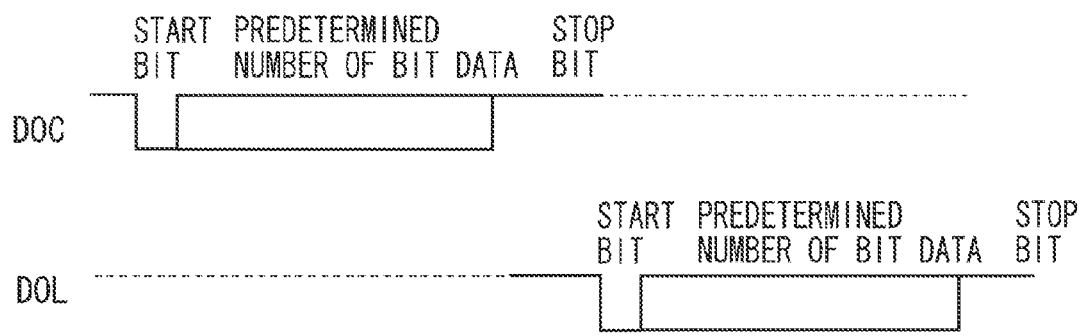
FIG. 10 is a timing chart illustrating communication signals of the camera and the interchangeable lens according to an asynchronous communications method.

FIG. 10 is a timing chart illustrating example asynchronous communications. When the camera microcomputer 13 transmits a lens information transmission request command or a lens actuator drive command to the lens microcomputer 21, the camera microcomputer 13 outputs an asynchronous data pattern at the baud rate having been set for the DOC signal.

In many cases, in asynchronous communications, the microcomputer outputs a start bit of L level. Then, the microcomputer outputs a predetermined number of bit data at the designated baud rate. If the microcomputer completes the output of the predetermined number of bit data, the microcomputer finally outputs a stop bit of H level to terminate the transmission of the DOC signal.

In asynchronous communications, the camera microcomputer 13 is not required to output the CLK signal and is also not required to receive a DOL signal from the lens unit 2 at the same time as the data transmission. When the lens microcomputer 21 transmits lens information to the camera 1 in response to a command received from the camera microcomputer 13, the lens microcomputer 21 does not use the CLK signal. When the lens microcomputer 21 is ready for the data transmission, the lens microcomputer 21 can output a DOL signal including the lens information at arbitrary timing, using communication protocols similar to those for the DOC signal.

When the communication method is switched to the asynchronous method, the camera microcomputer 13 and the lens microcomputer 21 are not required to confirm the cancellation of the "Busy state" that was required for each unit transmission data. As described above, the communication related setting operation according to the present exemplary embodiment is applicable to a camera system that includes a camera and a lens unit.

Next, an operation flow relating to settings for communications with an interchangeable lens, which can be realized by the camera microcomputer 13, is described with reference to flowcharts illustrated in FIG. 5 and subsequent drawings. If the power switch (not illustrated) is turned on, then in step 111 illustrated in FIG. 5, the camera microcomputer 13 starts its operation to communicate with the lens unit 2.

In step 111, as described in the operation flow of the camera system (see step 101 illustrated in FIG. 4), the camera microcomputer 13 performs settings for the communication control circuit 33 and the I/O control circuits 35 to 37 in such a way as to perform synchronous communications with the lens microcomputer 21 initially.

Accordingly, as a procedure required to perform synchronous communications, the camera microcomputer 13 checks the input level of the synchronous clock signal CLK outputting terminal and determines whether the lens unit 2 is in the "Busy state."

If it is determined that the input level of the signal CLK outputting terminal is H level and the lens unit 2 is not in the "Busy state" (NO in step 111), the processing proceeds to step 112.

In step 112, the camera microcomputer 13 sets data DATA_C1 (i.e., data to be initially transmitted to the lens microcomputer 21) in the transmission data register 55 and performs synchronous communications. The content of the data DATA_C1 is a lens information transmission command to acquire the type and name information of the interchangeable lens or determine whether the interchangeable lens is a new type capable of realizing asynchronous communications.

In step 113, the camera microcomputer 13 checks the input level of the synchronous clock signal CLK outputting terminal and determines whether the lens microcomputer 21 is in the "Busy state." The lens microcomputer 21 analyzes the content of the received data DATA_C1 and sets the "Busy state" by holding the CLK output terminal low in signal level until the lens microcomputer 21 starts corresponding processing. The camera microcomputer 13 waits until the lens microcomputer 21 completes the above-described processing and is brought into the "non-Busy state." Subsequently, the processing proceeds to step 114.

In step 114, the camera microcomputer 13 sets the "don't care data" DATA_C2 in the transmission data register 55 to perform synchronous communications.

In step 115, the camera microcomputer 13 acquires the DATA_L2 (i.e., the lens information transmitted from the lens microcomputer 21 in response to the data DATA_C2 transmitted in step 114) from the reception data register 56.

In step 116, the camera microcomputer 13 analyzes the lens information received in step 115 and determines whether the presently mounted lens unit 2 can perform asynchronous communications. If the camera microcomputer 13 determines that the presently mounted lens unit can perform asynchronous communications (YES in step 116), the processing proceeds to step 151 illustrated in FIG. 6.

In step 151, the camera microcomputer 13 checks the input level of the synchronous clock signal CLK outputting terminal and determines whether the lens unit 2 is in the "Busy state." If it is determined that the input level of the signal CLK outputting terminal is H level and the lens microcomputer 21 is not in the "Busy state" (NO in step 151), the processing proceeds to step 152.

In step 152, the camera microcomputer 13 sets the data DATA_C1 (i.e., the data to be transmitted to the lens microcomputer 21) in the transmission data register 55 and performs synchronous communications. The content of the data DATA_C1 is a command that requests the lens microcomputer 21 to measure a pulse width of a pulse to be output to the interchangeable lens immediately after the above-described communications for the baud rate adjustment required to perform asynchronous communications.

In step 153, the camera microcomputer 13 checks the input level of the synchronous clock signal CLK outputting terminal and determines whether the lens microcomputer 21 is in the "Busy state." If it is determined that the input level of the signal CLK outputting terminal is H level and the lens microcomputer 21 is not in the "Busy state" (NO in step 153), the processing proceeds to step 154.

In step 154, i.e., after the lens microcomputer 21 has cancelled the "Busy state", the camera microcomputer 13 starts outputting the baud rate adjustment pulse Tmes while holding the CLK signal low in output level. In response to the output of the baud rate adjustment pulse Tmes, the lens microcomputer 21 causes the counter/timer circuit 34 to start time measurement.

In step 155, the camera microcomputer 13 outputs the baud rate adjustment pulse Tmes that corresponds to predetermined number of clock counts. If it is determined that the output of the baud rate adjustment pulse Tmes corresponding to the predetermined number of clock counts is completed (YES in step S155), the processing proceeds to step 156. In step 156, the camera microcomputer 13 stops outputting the baud rate adjustment pulse Tmes and turns the CLK signal into High in output level.

In step 157, the camera microcomputer 13 waits until the synchronous clock signal CLK outputting terminal is held at L level for a predetermined time to output the signal Tbf indicating that the lens microcomputer 21 has completed the baud rate adjustment based on a measurement result of the baud rate adjustment pulse Tmes. The signal Tbf is described in detail below in the operation flow of the lens microcomputer 21. If it is determined that the camera microcomputer 13 has detected the signal Tbf (YES in step 157), the processing proceeds to step 158.

FIG. 9 is the timing chart illustrating communication signals of the camera 1 and the lens unit 2 to be generated in step 152 to step 157. The lens microcomputer 21 outputs Busy and Tbf for the CLK signal. The camera microcomputer 13 outputs Tmes for the CLK signal.

In step 158, the camera microcomputer 13 changes the method for communicating with the lens microcomputer 21. More specifically, the camera microcomputer 13 performs settings for the communication control circuit 33 and the I/O control circuits 35 to 37 in such a way as to perform asynchronous communications with the lens microcomputer 21. The baud rate determined in the above-described step is set in the communication control circuit 33. Then, the camera microcomputer 13 starts communicating with the lens microcomputer 21 according to the asynchronous communication method described with reference to the flowchart illustrated in FIG. 10.

Figure 5:
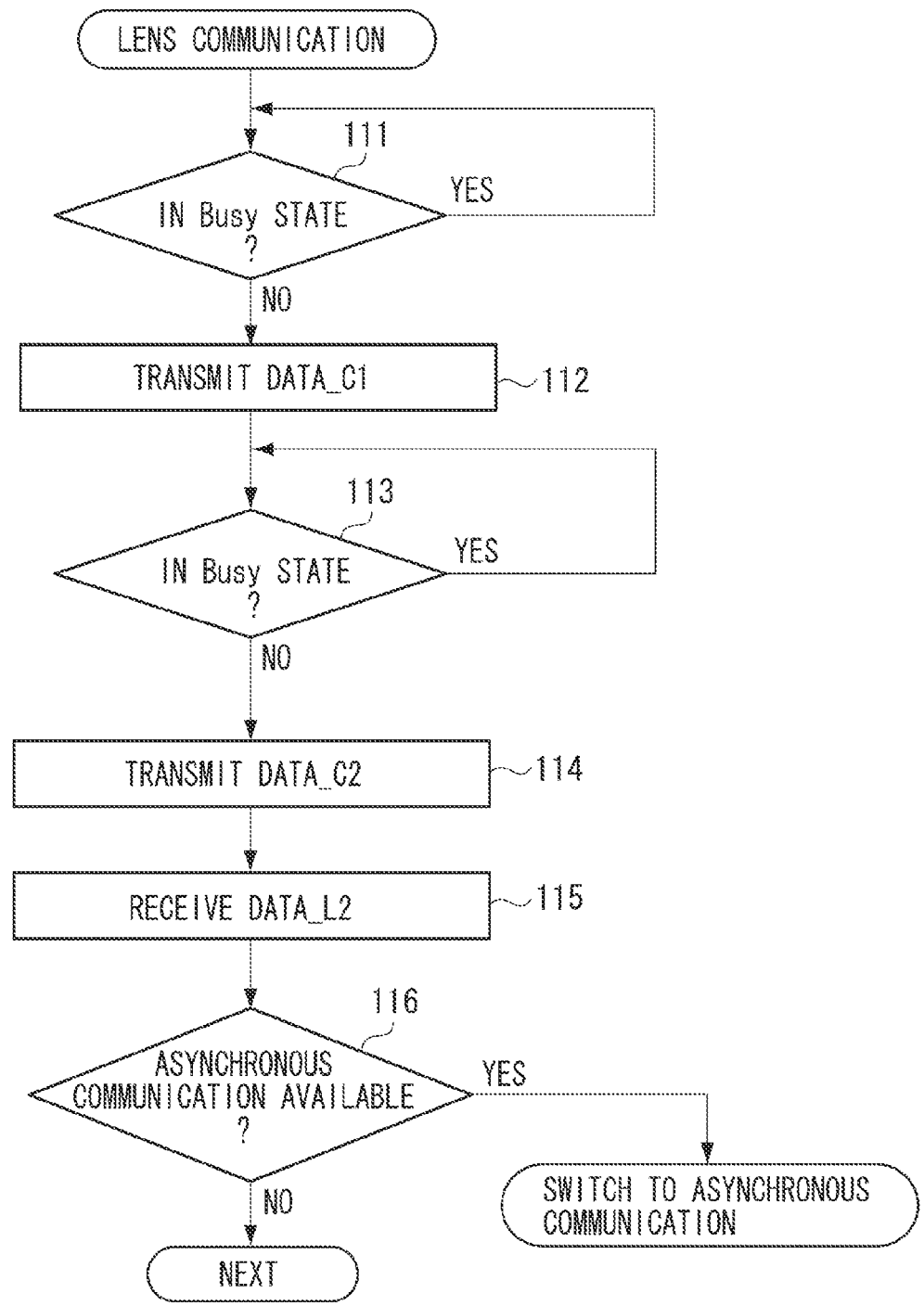
FIG. 5 is a flowchart illustrating an example operation that can be performed by a camera microcomputer according to a first exemplary embodiment of the present invention.
Figure 6:
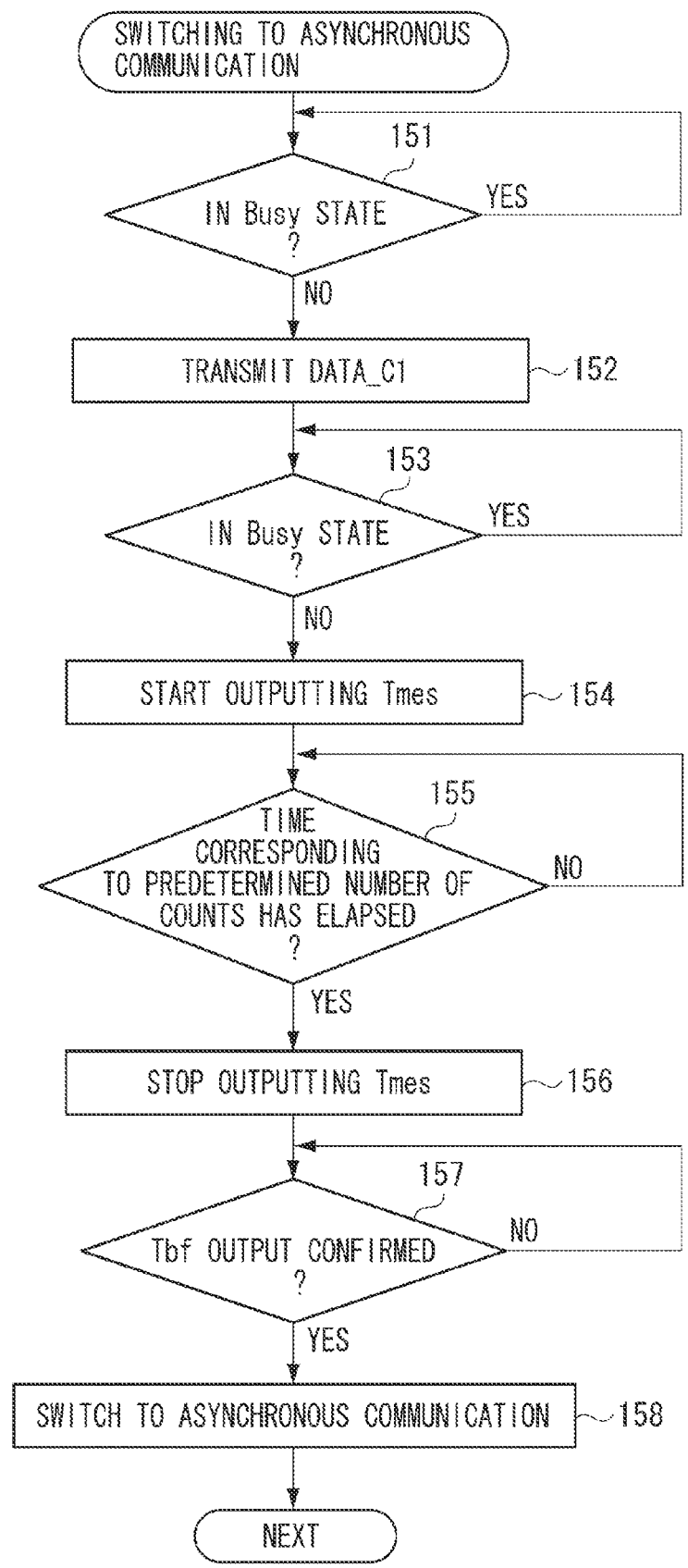
FIG. 6 is a flowchart illustrating an example operation that can be performed by the camera microcomputer according to the first exemplary embodiment of the present invention.

If in step 116 illustrated in illustrated in FIG. 5 the camera microcomputer 13 determines that the presently mounted lens unit cannot perform asynchronous communications, the camera microcomputer 13 does not execute the processing in the above-described steps illustrated in FIG. 6. Instead, the camera microcomputer 13 continuously communicates with the lens microcomputer 21 according the synchronous communication method.

Figure 7:
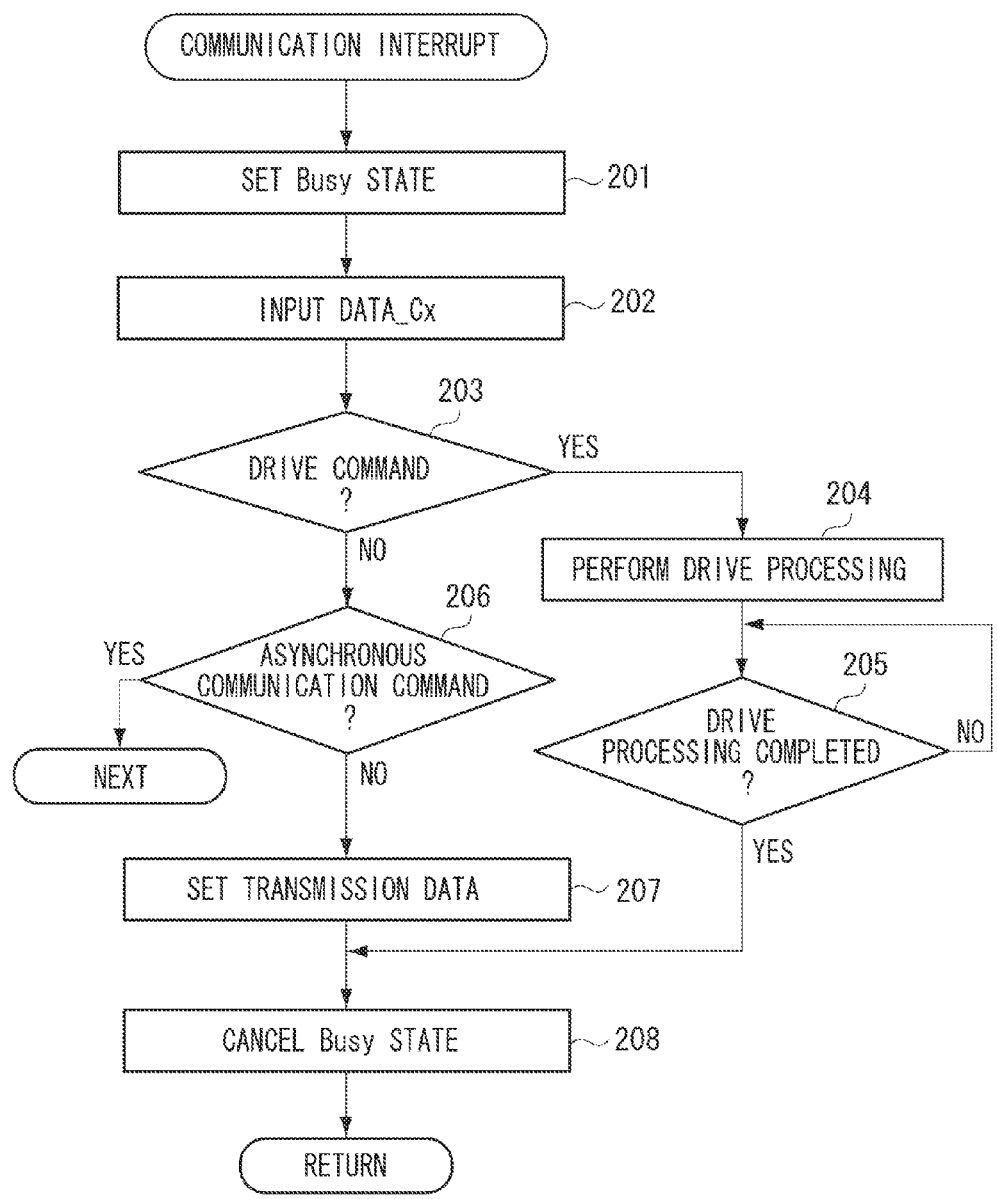
FIG. 7 is a flowchart illustrating an example operation that can be performed by a lens microcomputer according to the first exemplary embodiment of the present invention.

FIG. 7 is a flowchart illustrating an example operation that can be performed by the lens microcomputer 21 to perform information communications with the camera microcomputer 13. If the lens unit 2 is mounted on the camera 1 and the lens microcomputer 21 becomes operable with electric power supplied from the camera 1, the lens microcomputer 21 initially performs settings for the communication control circuit 33 and the I/O control circuits 35 to 37, as communication slave settings according to the synchronous method, as described in step 101 illustrated in FIG. 4. In the above-described state, if an interrupt signal is received from the camera through synchronous communications, the lens microcomputer 21 executes an operation flow starting with step 201.

In step 201, the lens microcomputer 21 turns the synchronous clock signal CLK receiving terminal into L level so that the camera 1 can determine that the lens unit 2 is in the "Busy state." In step 202, the lens microcomputer 21 acquires the reception data DATA_C1 (i.e., the data received from the camera) from the reception data register 56 and analyzes the content of the reception data DATA_C1. The reception data transmitted from the camera 1 is nothing more than DATA_C1 initially. However, in the flowchart the reception data transmitted from the camera 1 is represented by the generalized expression DATA_Cx because the data DATA_C2 may be transmitted subsequently.

In step 203, the lens microcomputer 21 determines whether the data DATA_C1 received from the camera 1 is a drive command for the actuator of the lens unit 2. If it is determined that the data DATA_C1 is the drive command (YES in step 203), the processing proceeds to step 204. In step 204, the lens microcomputer 21 performs drive processing for the actuator of the lens unit 2 according to the content of the data DATA_C1 received from the camera 1.

In step 205, the lens microcomputer 21 determines whether the drive processing for the actuator of the lens unit 2 is completed and the next communication from the camera 1 is acceptable. If it is determined that the next communication from the camera 1 is acceptable (YES in step 205), the processing proceeds to step 208.

If it is determined that the data DATA_C1 received from the camera 1 is not the drive command for the actuator of the lens unit 2 (NO in step 203), the processing proceeds to step 206.

In step 206, the lens microcomputer 21 determines whether the data DATA_C1 received from the camera 1 is a command that requests the lens microcomputer 21 to perform time measurement of the baud rate adjustment pulse Tmes required for the switching to asynchronous communications. If it is determined that the reception data DATA_C1 does not request the time measurement of the baud rate adjustment pulse Tmes (NO in step 206), namely, when the reception data DATA_C1 is a lens information data transmission request, the processing proceeds to step 207.

In step 207, the lens microcomputer 21 sets required lens information data according to the data DATA_C1 received from the camera 1 in the transmission data register 55. If the required lens information is lens information acquiring the type and name information of the lens unit 2 or determining whether the lens unit 2 is a new type capable of realizing asynchronous communications, the lens microcomputer 21 sets the information data in the transmission data register 55.

In step 208, the lens microcomputer 21 turns the synchronous clock signal CLK receiving terminal into H level so that the camera 1 can determine that the lens unit 2 is not in the "Busy state."

Figure 8:
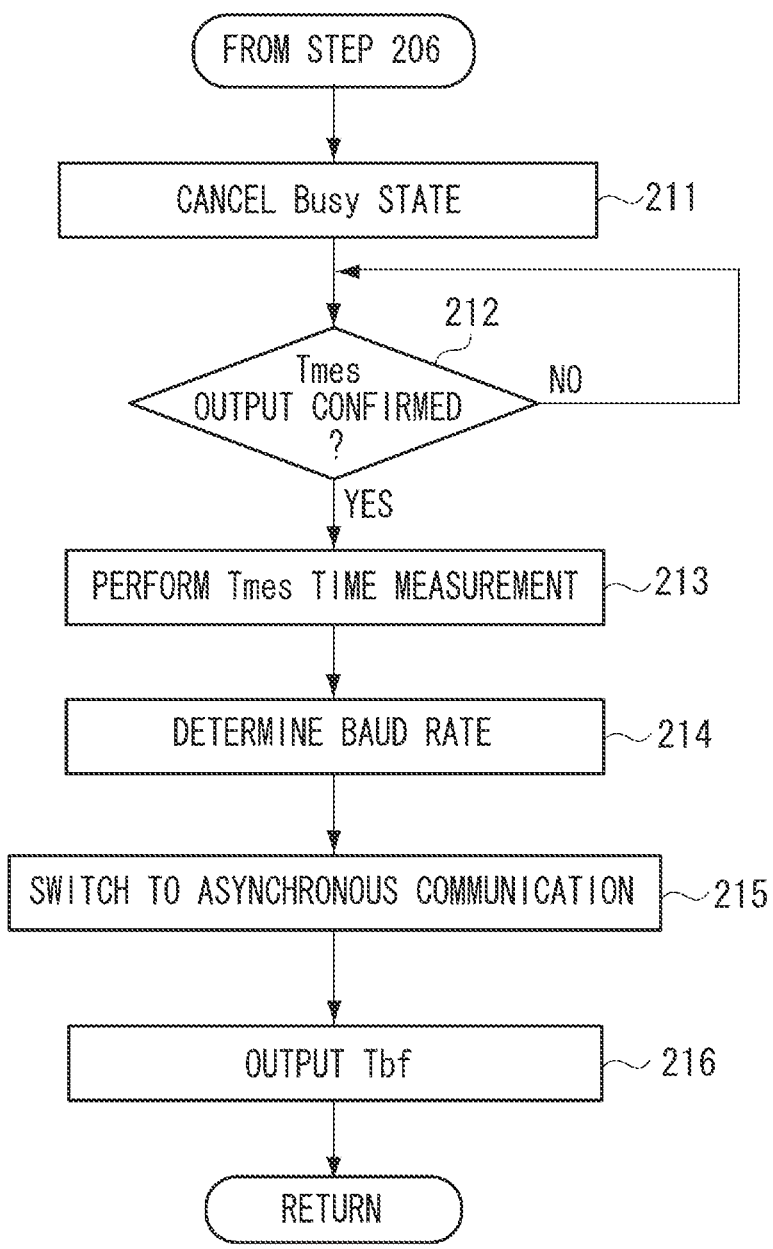
FIG. 8 is a flowchart illustrating an example operation that can be performed by the lens microcomputer according to the first exemplary embodiment of the present invention.

If it is determined that the data DATA_C1 received from the camera 1 requests the time measurement of the baud rate adjustment pulse Tmes required for the switching to asynchronous communications (YES in step 206), the processing proceeds to step 211 illustrated in FIG. 8.

In step 211, the lens microcomputer 21 turns the synchronous clock signal CLK receiving terminal into H level so that the camera microcomputer 13 can determine that the lens unit 2 is not in the "Busy state."

In step 212, the lens microcomputer 21 waits until the camera 1 outputs the baud rate adjustment pulse Tmes for the CLK signal. If the camera microcomputer 13 outputs the baud rate adjustment pulse Tmes (YES in step 212), then in step 213, the lens microcomputer 21 causes the counter/timer circuit 34 to start time measurement and continuously perform the time measurement until the baud rate adjustment pulse Tmes turns into H level.

If the baud rate adjustment pulse Tmes turns into H level, then in step 214, the lens microcomputer 21 causes the counter/timer circuit 34 to terminate the time measurement. The lens microcomputer 21 receives a measurement value from the counter/timer circuit 34 as information relating to a relative deviation in oscillatory frequency accuracy of the camera microcomputer 13 that corresponds to the oscillatory frequency accuracy of the lens microcomputer 21.

The lens microcomputer 21 determines a baud rate required to perform asynchronous communications with reference to a deviation of the measurement value obtained by the counter/timer circuit 34 relative to the ideal value.

In step 215, the lens microcomputer 21 changes the method for communicating with the camera 1. More specifically, the lens microcomputer 21 performs settings for the communication control circuit 33 and the I/O control circuits 35 to 37 in such a way as to perform asynchronous communications with the camera microcomputer 13.

In step 216, the lens microcomputer 21 turns the synchronous clock signal CLK outputting terminal into L level for a predetermined time to output the signal Tbf indicating that the baud rate adjustment has been completed based on a measurement result of the baud rate adjustment pulse Tmes and settings for asynchronous communications have been completed. Subsequently, the lens microcomputer 21 starts communicating with the camera microcomputer 13 according to the asynchronous communication method described with reference to the timing chart illustrated in FIG. 10.

In some cases, a lens unit capable of performing asynchronous communications may be mounted on a camera that cannot perform asynchronous communications. In such cases, the camera does not transmit any command that requests the output of the baud rate adjustment pulse Tmes. Therefore, the lens microcomputer is not required to execute the above-described processing in steps illustrated in FIG. 8. The lens microcomputer continues synchronous communications.

The camera may be configured to adjust the baud rate for asynchronous communications. In general, the camera microcomputer is configured to communicate with a plurality of devices (including a flash unit) in addition to the lens unit. However, if the camera microcomputer adjusts the settings for the clock generation circuit provided in the microcomputer to change the baud rate required to communicate with the lens unit, the baud rate for communications with the flash unit is changed correspondingly. Therefore, the camera microcomputer cannot change the baud rate freely. On the other hand, the lens microcomputer is generally configured to communicate with only the camera. Therefore, it is useful that the lens unit adjusts the baud rate as described in the present exemplary embodiment because the camera microcomputer is not subjected to the above-described constraint.

The camera and the lens unit described in the above-described first exemplary embodiment are mere examples that can realize the present invention. As described in step 105 illustrated in FIG. 4, the output terminal via which the camera microcomputer outputs the baud rate adjustment pulse Tmes is not limited to the CLK terminal described in the first exemplary embodiment.

The DOC terminal or the DOL terminal can be used to output the baud rate adjustment pulse Tmes. Further, in the first exemplary embodiment, the camera microcomputer generates the baud rate adjustment pulse Tmes in the duration from a fall point to a rise point of the signal output. However, the baud rate adjustment pulse Tmes is not limited to the illustrated example.

Further, when the switching between the open drain method and the CMOS method can be realized in a communication circuit for a camera and an interchangeable lens as discussed in Japanese Patent Application Laid-Open No. 9-304804, it is desired that the camera microcomputer outputs the baud rate adjustment pulse Tmes after the circuit is switched to the CMOS method because the output waveform has a relatively smaller delay component.

In the first exemplary embodiment, the camera outputs the baud rate adjustment pulse Tmes immediately after the lens has stopped outputting the "Busy signal." However, the output timing of the baud rate adjustment pulse Tmes is not limited to the above-described example.

Further, the lens microcomputer holds the synchronous clock signal CLK outputting terminal low in signal level for a predetermined time to output the signal Tbf indicating the completion of settings for asynchronous communications. However, the method for notifying the setting completion is not limited to the above-described embodiment. For example, a method that does not lower the terminal level to L level for a predetermined time is employable. Any terminal other than the CLK terminal can be used and another communication method can also be used.

Further, an electronic component (e.g., an oscillator) employed for a microcomputer or an oscillation circuit has temperature-dependent characteristics. The oscillatory frequency is variable in a certain range according to a temperature change.

Accordingly, it is desired to perform the baud rate adjustment at timing other than the time immediately before the switching from synchronous communications to asynchronous communications as described in step 105 illustrated in FIG. 4.

More specifically, the camera microcomputer 13 can be configured to monitor the output of the temperature sensor 19 at appropriate time intervals during the operation thereof. If a detected temperature change exceeds a predetermined level, the camera microcomputer 13 can instruct the lens microcomputer 21 to perform the baud rate adjustment again.

In the above-described first exemplary embodiment, the lens microcomputer 21 performs baud rate adjustment based on a measurement result of the baud rate adjustment pulse Tmes generated by the camera microcomputer 13. On the other hand, the camera can be configured to measure the baud rate adjustment pulse Tmes generated by the lens microcomputer 21 and can transmit measurement data to the lens microcomputer 21 to enable the lens microcomputer 21 to perform baud rate adjustment, as described below as a second exemplary embodiment of the present invention.

A camera system including a camera and a lens unit according to the second exemplary embodiment has a configuration similar to that of the camera system according to the first exemplary embodiment described with reference to FIG. 1 to FIG. 3.

Figure 14:
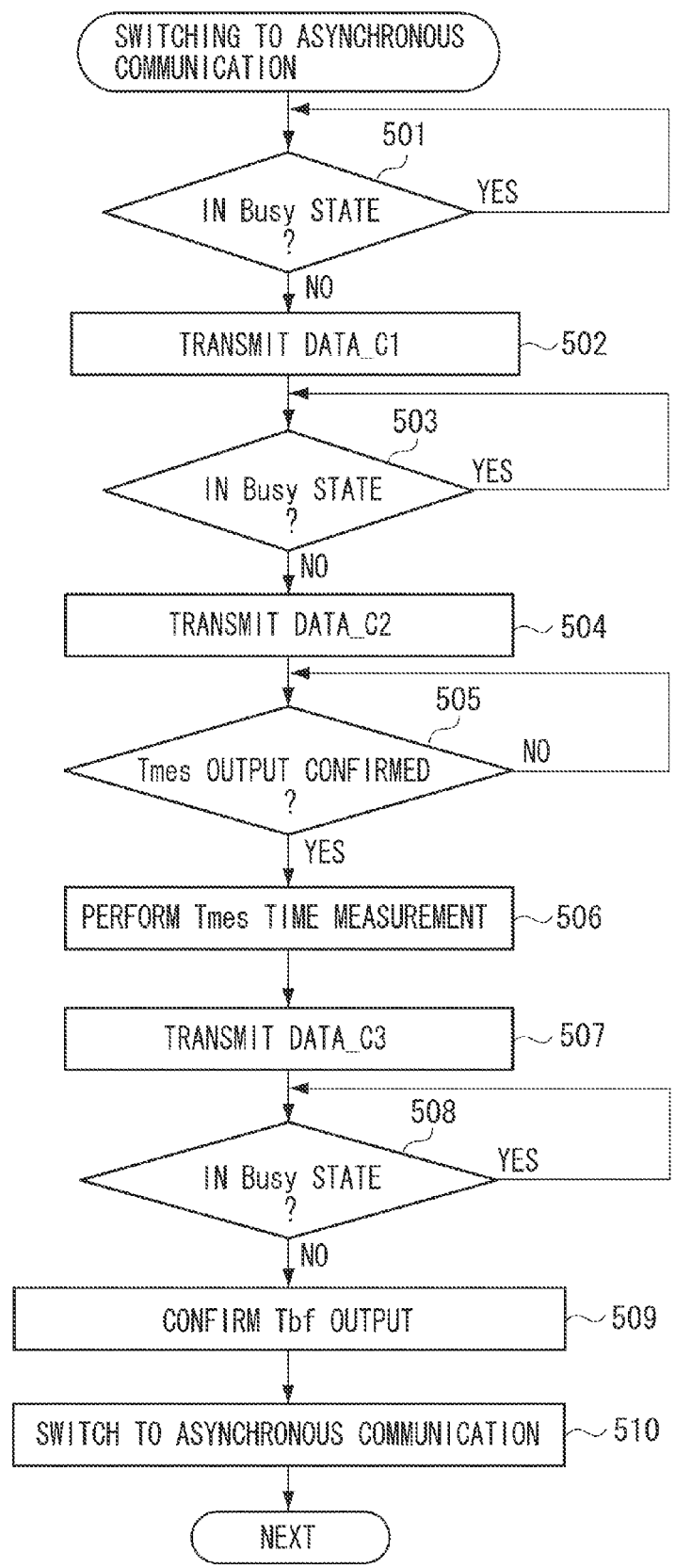
FIG. 14 is a flowchart illustrating an example operation that can be performed by the camera microcomputer according to a second exemplary embodiment of the present invention.

In an operation flow relating to communication settings, similar to the first exemplary embodiment, the camera microcomputer 13 performs settings to communicate with the lens microcomputer 21 according to the flowchart starting from step 111 illustrated in FIG. 5. If in step 116 illustrated in FIG. 5 the camera microcomputer 13 determines that the presently mounted lens unit can perform asynchronous communications, the processing proceeds to step 501 illustrated in FIG. 14.

In step 501, the camera microcomputer 13 checks the input level of the synchronous clock signal CLK outputting terminal and determines whether the lens unit 2 is in the "Busy state." If it is determined that the input level of the signal CLK outputting terminal is H level and the lens microcomputer 21 is not in the "Busy state" (NO in step 501), the processing proceeds to step 502.

In step 502, the camera microcomputer 13 sets the data DATA_C1 (i.e., the data to be transmitted to the lens microcomputer 21) in the transmission data register 55 and performs synchronous communications. The content of the data DATA_C1 is a command that requests the lens microcomputer 21 to output a pulse to be measured for the baud rate adjustment required to perform asynchronous communications.

In step 503, the camera microcomputer 13 checks the input level of the synchronous clock signal CLK outputting terminal and determines whether the lens microcomputer 21 is in the "Busy state." If it is determined that the input level of the signal CLK outputting terminal is H level and the lens microcomputer 21 is not in the "Busy state" (NO in step 503), the processing proceeds to step 504.

In step 504, i.e., after the lens microcomputer 21 has cancelled the "Busy state", the camera microcomputer 13 sets the "don't care data" DATA_C2 in the transmission data register 55 and performs synchronous communications. In step 505, the lens microcomputer 21 starts outputting the baud rate adjustment pulse Tmes while holding the CLK signal low in output level immediately after the reception of the data DATA_C2. In response to the output of the baud rate adjustment pulse Tmes, the camera microcomputer 13 causes the counter/timer circuit 34 to start time measurement.

In step 506, i.e., after the lens microcomputer 21 stops outputting the baud rate adjustment pulse Tmes and the CLK signal changes to High in output level, the camera microcomputer 13 causes the counter/timer circuit 34 to complete the time measurement. The camera microcomputer 13 receives a measurement value from the counter/timer circuit 34 as information relating to a relative deviation in oscillatory frequency accuracy of the lens microcomputer 21 that corresponds to the oscillatory frequency accuracy of the camera microcomputer 13.

In step 507, the camera microcomputer 13 sets time measurement information indicating the baud rate adjustment pulse Tmes obtained in step 506, as DATA_C3, in the transmission data register 55 and performs synchronous communications with the lens microcomputer 21. In step 508, the camera microcomputer 13 checks the input level of the synchronous clock signal CLK outputting terminal and determines whether the lens microcomputer 21 is in the "Busy state." If it is determined that the input level of the signal CLK outputting terminal is H level and the lens microcomputer 21 is not in the "Busy state" (NO in step 508), the processing proceeds to step 509.

In step 509, the camera microcomputer 13 checks the input level of the synchronous clock signal CLK outputting terminal again after the lens microcomputer 21 is released from the "Busy state." Further, the camera microcomputer 13 confirms the output of the signal Tbf indicating that the lens microcomputer 21 has completed the baud rate settings based on time measurement information of the baud rate adjustment pulse Tmes transmitted in the step 507 and settings for asynchronous communications have been completed.

In step 510, the camera microcomputer 13 changes the method for communicating with the lens microcomputer 21. More specifically, the camera microcomputer 13 performs settings for the communication control circuit 33 and the I/O control circuits 35 to 37 in such a way as to perform asynchronous communications with the lens microcomputer 21. The baud rate determined in the above-described step is set in the communication control circuit 33. Then, the camera microcomputer 13 starts communicating with the lens microcomputer 21 according to the asynchronous communication method described with reference to the flowchart illustrated in FIG. 10.

Figure 16:
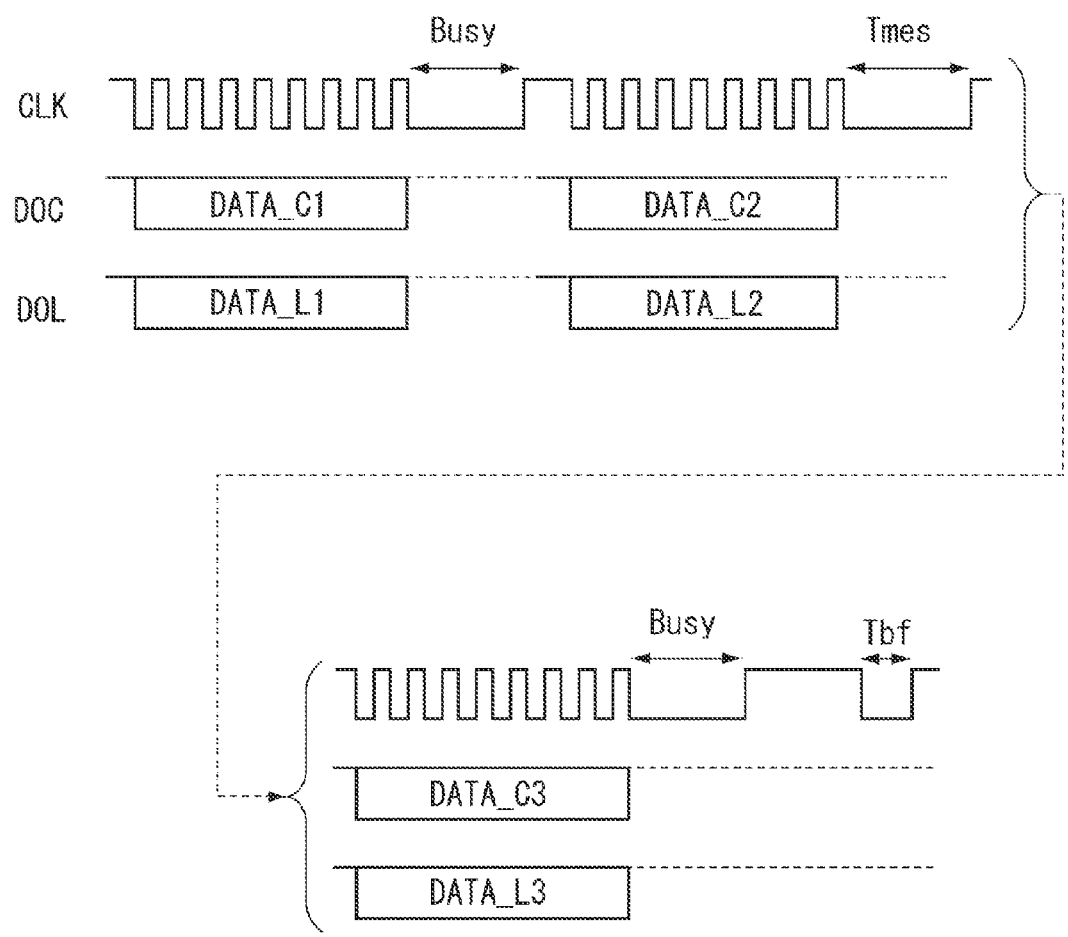
FIG. 16 is a timing chart illustrating communication signals of the camera and the interchangeable lens according to the second exemplary embodiment of the present invention.

FIG. 16 is a timing chart illustrating communication signals of the camera 1 and the lens unit 2 to be generated in step 501 to step 510. The lens microcomputer 21 outputs Busy for the CLK signal. The lens microcomputer 21 also outputs Tmes and Tbf for the CLK signal.

Subsequently, an operation flow relating to information communications that can be performed by the lens microcomputer 21 to communicate with the camera microcomputer 13 according to the second exemplary embodiment is described in detail below with reference to a flowchart illustrated in FIG. 15.

Similar to the first exemplary embodiment, if the lens unit 2 is mounted on the camera 1 and the lens microcomputer 21 becomes operable with electric power supplied from the camera 1, the lens microcomputer 21 initially performs settings for the communication control circuit 33 and the I/O control circuits 35 to 37 as communication slave settings according to the synchronous method. In the above-described state, if an interrupt signal is received from the camera through synchronous communications, the lens microcomputer 21 executes an operation flow starting with step 551 illustrated in FIG. 15.

In step 551, the lens microcomputer 21 holds the synchronous clock signal CLK receiving terminal low in signal level so that the camera microcomputer 13 can determine that the lens microcomputer 21 is in the "Busy state." In step 552, the lens microcomputer 21 acquires the data DATA_C1 (i.e., the data transmitted from the camera 1) from the reception data register 56 and analyzes the content of the reception data DATA_C1.

The reception data transmitted from the camera 1 is nothing more than DATA_C1 initially. However, in the flowchart the reception data transmitted from the camera 1 is represented by the generalized expression DATA_Cx because the data DATA_C2 may be transmitted subsequently.

If it is determined that the data DATA_C1 received from the camera 1 is a drive command for the actuator of the lens unit 2 (YES in step 553), the processing proceeds to step 554. In step 554, the lens microcomputer 21 performs drive processing for the actuator of the lens unit 2 according to the content of the data DATA_C1 received from the camera microcomputer 13.

In step 555, the lens microcomputer 21 determines whether the drive processing for the actuator of the lens unit 2 is completed and the next communication from the camera 1 is acceptable. If it is determined that the next communication from the camera 1 is acceptable (YES in step 555), the processing proceeds to step 558.

If it is determined that the data DATA_C1 received from the camera microcomputer 13 is not the drive command for the actuator of the lens unit 2 (NO in step 553), the processing proceeds to step 556. In step 556, the lens microcomputer 21 determines whether the data DATA_C1 received from the camera microcomputer 13 is a command that requests the lens microcomputer 21 to output the baud rate adjustment pulse Tmes for the switching to asynchronous communications.

If it is determined that the reception data DATA_C1 does not request outputting the baud rate adjustment pulse Tmes (NO in step 556), namely, when the reception data DATA_C1 is a lens information data transmission request, the processing proceeds to step 557.

In step 557, the lens microcomputer 21 sets required lens information data according to the data DATA_C1 received from the camera microcomputer 13 in the transmission data register 55. If the required lens information is lens information for acquiring the type and name information of the lens unit 2 or determining whether the lens unit 2 is a new type capable of realizing asynchronous communications, the lens microcomputer 21 sets the information data in the transmission data register 55.

In step 558, the lens microcomputer 21 turns the synchronous clock signal CLK receiving terminal into H level so that the camera microcomputer 13 can determine that the lens microcomputer 21 is not in the "Busy state."

If it is determined that the data DATA_C1 received from the camera microcomputer 13 requests outputting the baud rate adjustment pulse Tmes for the switching to asynchronous communications (YES in step 556), the processing proceeds to step 559. In step 559, the lens microcomputer 21 waits until the "don't care data" DATA_C2 is transmitted from the camera microcomputer 13 through synchronous communications. If it is determined that the lens microcomputer 21 has received the data DATA_C2 (YES in step 559), the processing proceeds to step 560.

In step 560, the lens microcomputer 21 starts outputting the baud rate adjustment pulse Tmes while holding the CLK signal low in output level. If the output of the baud rate adjustment pulse Tmes corresponding to a predetermined number of clock counts is completed, the processing proceeds to step 561.

In step 561, the lens microcomputer 21 waits until the camera microcomputer 13 transmits the data DATA_C3 (i.e., the time measurement information of the baud rate adjustment pulse Tmes) through synchronous communications. If it is determined that the lens microcomputer 21 has received the data DATA_C3 (YES in step 561), the processing proceeds to step 562.

In step 562, the lens microcomputer 21 determines a baud rate required to perform asynchronous communications with reference to a deviation of the received time measurement information of the baud rate adjustment pulse Tmes relative to the ideal value.

In step 563, the lens microcomputer 21 changes the method for communicating with the camera 1. More specifically, the lens microcomputer 21 performs settings for the communication control circuit 33 and the I/O control circuits 35 to 37 in such a way as to perform asynchronous communications with the camera microcomputer 13.

In step 564, the lens microcomputer 21 turns the synchronous clock signal CLK outputting terminal into L level for a predetermined time to output the signal Tbf indicating that the baud rate adjustment has been completed based on a measurement result of the baud rate adjustment pulse Tmes and settings for asynchronous communications have been completed. Subsequently, the lens microcomputer 21 starts communicating with the camera microcomputer 13 according to the asynchronous communication method described with reference to the flowchart illustrated in FIG. 10

Figure 15:
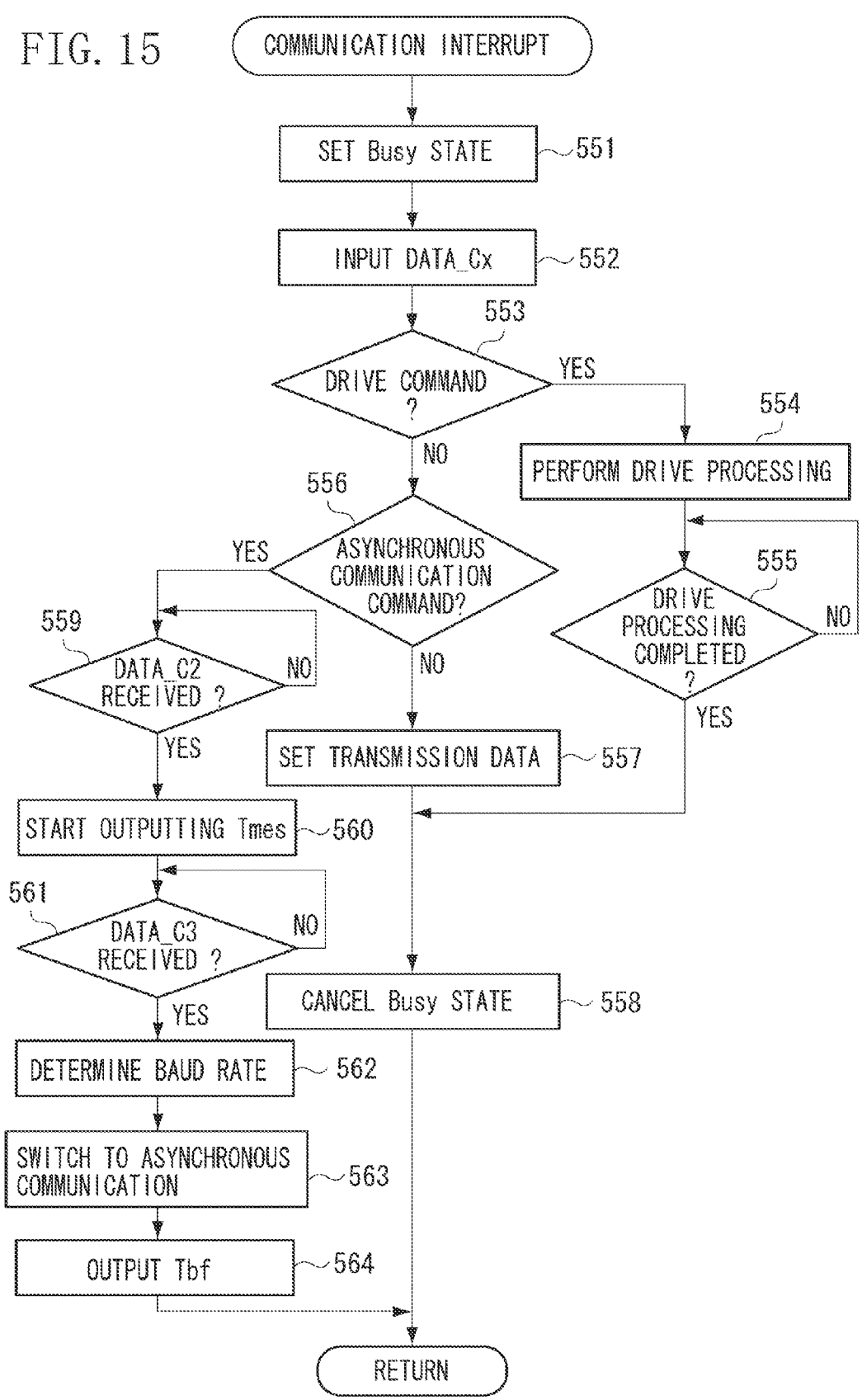
FIG. 15 is a flowchart illustrating an example operation that can be performed by the lens microcomputer according to the second exemplary embodiment of the present invention.

In the second exemplary embodiment, as described in step 560 illustrated in FIG. 15, the output terminal via which the lens microcomputer 21 outputs the baud rate adjustment pulse Tmes is not limited to the CLK terminal. The DOC terminal or the DOL terminal can be used to output the baud rate adjustment pulse Tmes. Further, the lens microcomputer generates the baud rate adjustment pulse Tmes in the duration from a fall point to a rise point of the signal output. However, the baud rate adjustment pulse Tmes is not limited to the illustrated example.

Further, when the switching between the open drain method and the CMOS method can be realized in a communication circuit for a camera and an interchangeable lens as discussed in Japanese Patent Application Laid-Open No. 9-304804, it is desired that the lens microcomputer outputs the baud rate adjustment pulse Tmes after the circuit is switched to the CMOS method because the output waveform has a relatively smaller delay component.

In the second exemplary embodiment, the camera outputs the baud rate adjustment pulse Tmes immediately after the lens computer has received the data DATA_C2. However, the output timing of the baud rate adjustment pulse Tmes is not limited to the above-described example.

Further, the lens microcomputer holds the synchronous clock signal CLK outputting terminal low in signal level for a predetermined time to output the signal Tbf indicating the completion of settings for asynchronous communications. However, the method for notifying the setting completion is not limited to the above-described embodiment. For example, a method that does not lower the terminal level to L level for a predetermined time is employable. Any terminal other than the CLK terminal can be used and another communication method can also be used.

Further, an electronic component (e.g., an oscillator) employed for a microcomputer or an oscillation circuit has temperature-dependent characteristics. The oscillatory frequency is variable in a certain range according to a temperature change.

Accordingly, similar to the first exemplary embodiment, it is desired to perform the baud rate adjustment at timing other than the time immediately before the switching from synchronous communications to asynchronous communications as described above.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-279881 filed Dec. 15, 2010, which is hereby incorporated by reference herein in its entirety.

What is claimed is:

1. An imaging apparatus to which a lens unit can be detachably mounted, comprising:
    a first terminal and a second terminal for communication with the mounted lens unit; and
    a control unit configured to perform switching between a first communication mode in which a clock signal is output via the first terminal and communication is performed with the lens unit via the second terminal based on the clock signal and a second communication mode in which communication is performed with the lens unit without outputting the clock signal,
    wherein the control unit continues the first communication mode if it is determined that the lens unit is not available for the second communication mode,
    wherein the control unit communicates with the lens unit in the second communication mode at a baud rate determined by the lens unit if it is determined that the lens unit is available for the second communication mode, and wherein the control unit sets the second communication mode after a first signal notifying completion of baud rate settings is received from the lens unit.

2. The imaging apparatus according to claim 1, wherein the control unit controls a signal level of the first terminal or the second terminal to keep at a predetermined level for a time corresponding to a predetermined clock count if it is determined that the lens unit is available for the second communication mode.

3. The imaging apparatus according to claim 2, wherein the control unit transmits a second signal for instructing time measurement while the signal level of the first terminal or the second terminal is kept at the predetermined level, to the lens unit via the second terminal.

4. The imaging apparatus according to claim 1, wherein the baud rate in the second communication mode is determined by the lens unit based on time measured by the lens unit in response to the second signal.

5. The imaging apparatus according to claim 1, wherein the control unit measures time while a signal level of the first terminal or the second terminal is kept at a predetermined level by the lens unit if it is determined that the lens unit is available for the second communication mode, and transmits data on the measured time to the lens unit via the second terminal.

6. The imaging apparatus according to claim 5, wherein the baud rate in the second communication mode is determined by the lens unit based on the data on the measured time transmitted from the control unit via the second terminal.

7. The imaging apparatus according to claim 1, further comprising:

a temperature detection unit configured to obtain information indicating internal temperature of the imaging apparatus, wherein the control unit transmits information instructing to set the baud rate again based on a detection result obtained by the temperature detection unit, in the second communication mode, to the lens unit.

8. The imaging apparatus according to claim 1, wherein the control unit transmits a second signal for baud rate adjustment of the second communication mode to the lens unit via the second terminal if it is determined that the lens unit is available for the second communication mode.

9. A lens unit attachable to an imaging apparatus, comprising:

a first lens terminal and a second lens terminal for communication with the imaging apparatus; and a lens control unit configured to perform switching between a first communication mode in which a clock signal is input via the first lens terminal and communication is performed with the imaging apparatus via the second lens terminal based on the clock signal and a second communication mode in which communication is performed with the imaging apparatus without inputting the clock signal, wherein the lens control unit determines a baud rate to be used in the second communication mode and transmits a first signal notifying completion of baud rate settings to the imaging apparatus.

10. The lens unit according to claim 9, wherein the lens control unit measures time while a signal level of the first lens terminal or the second lens terminal is kept at a predetermined level by the imaging apparatus, and determines the baud rate to be used in the second communication mode based on the measured time.

11. The lens unit according to claim 9, wherein the lens control unit controls a signal level of the first lens terminal or the second lens terminal to keep at a predetermined level for a time corresponding to a predetermined clock count.

12. The lens unit according to claim 11, wherein the lens control unit receives data on time while the signal level of the first lens terminal or the second lens terminal to keep at the predetermined level measured by the imaging apparatus via the second lens terminal, and determines the baud rate to be used in the second communication mode based on the received data.

13. The lens unit according to claim 9, wherein the lens control unit receives a second signal for baud rate adjustment of the second communication mode from the imaging apparatus via the second lens terminal.

14. A method of controlling an imaging apparatus to which a lens unit can be detachably mounted, that includes a first terminal and a second terminal for communication with the mounted lens unit, the method comprising:

switching between a first communication mode in which a clock signal is output via the first terminal and communication is performed with the lens unit via the second terminal based on the clock signal and a second communication mode in which communication is performed with the lens unit without outputting the clock signal, and determining whether the lens unit is available for the second communication mode or not, wherein the first communication mode is continued if it is determined that the lens unit is not available for the second communication mode, wherein the second communication mode is performed at a baud rate determined by the lens unit if it is determined that the lens unit is available for the second communication mode, and wherein the second communication mode is set after a first signal notifying completion of baud rate settings is received from the lens unit.

15. A method of controlling a lens unit attachable to an imaging apparatus, that includes a first lens terminal and a second lens terminal for communication with the imaging apparatus, the method comprising:

switching between a first communication mode in which a clock signal is input via the first lens terminal and communication is performed with the imaging apparatus via the second lens terminal based on the clock signal and a second communication mode in which communication is performed with the imaging apparatus without inputting the clock signal, determining a baud rate to be used in the second communication mode, and transmitting a first signal notifying completion of baud rate settings to the imaging apparatus.

* * * * *